US008350932B2

(12) United States Patent
Iwasaki et al.

(10) Patent No.: US 8,350,932 B2
(45) Date of Patent: Jan. 8, 2013

(54) IMAGE GENERATION DEVICE AND IMAGE GENERATION METHOD FOR GENERATING A HIGH-QUALITY IMAGE BY USING INFORMATION FROM A LOW-QUALITY IMAGE

(75) Inventors: Masahiro Iwasaki, Kyoto (JP); Lorcan MacManus, Cambridge (GB); Neil Dodgson, Cambridge (GB)

(73) Assignee: Panasonic Corporation, Osaka (JP)

( * ) Notice: Subject to any disclaimer, the term of this patent is extended or adjusted under 35 U.S.C. 154(b) by 112 days.

(21) Appl. No.: 13/000,743

(22) PCT Filed: Jul. 30, 2008

(86) PCT No.: PCT/EP2008/006291
§ 371 (c)(1),
(2), (4) Date: Dec. 22, 2010

(87) PCT Pub. No.: WO2010/012289
PCT Pub. Date: Feb. 4, 2010

(65) Prior Publication Data
US 2011/0102641 A1    May 5, 2011

(51) Int. Cl.
*H04N 5/262* (2006.01)
(52) U.S. Cl. .................................. 348/240.99
(58) Field of Classification Search ............. 348/240.99, 348/222.1; 382/181
See application file for complete search history.

(56) References Cited

U.S. PATENT DOCUMENTS

| 2005/0190670 A1 | 9/2005 | Kim et al. |
| 2006/0003328 A1 | 1/2006 | Grossberg et al. |
| 2008/0025190 A1 | 1/2008 | Yokoi et al. |
| 2008/0186390 A1 | 8/2008 | Sato et al. |
| 2009/0161945 A1* | 6/2009 | Morgan-Mar et al. ........ 382/154 |
| 2009/0304299 A1 | 12/2009 | Motomura et al. |

FOREIGN PATENT DOCUMENTS

| CN | 1771540 | 5/2006 |
| CN | 101114469 | 1/2008 |
| JP | 10-222700 | 8/1998 |

(Continued)

OTHER PUBLICATIONS

International Search Report issued Sep. 3, 2009 in International Application No. PCT/EP2008/006291.

(Continued)

*Primary Examiner* — Usman Khan
(74) *Attorney, Agent, or Firm* — Wenderoth, Lind & Ponack, L.L.P.

(57) ABSTRACT

Provided is an image generation device generating a high-quality image of an object under a pseudo light source at any desired position, based on geometric parameters generated from a low-quality image of the object. The image generation device includes: a geometric parameter calculation unit (102) that calculates a first geometric parameter regarding a surface structure from light source position, viewpoint position, and geometric normal information regarding the surface structure; a high-resolution database unit (103) that stores an exemplum indicating a mesostructure of a portion of the surface and has a spatial resolution higher than the geometric normal information; an exemplum expansion unit (104) that increases the exempla to be spatially expanded; a geometric parameter modification unit (105) that modifies the first geometric parameter using the increased exempla; and an image generation unit (106) that generates an output image by applying the modified geometric parameter to a reflection model.

10 Claims, 17 Drawing Sheets

FOREIGN PATENT DOCUMENTS

| | | |
|---|---|---|
| JP | 2001-189851 | 7/2001 |
| JP | 2003-223650 | 8/2003 |
| JP | 2005-522108 | 7/2005 |
| JP | 2006-31595 | 2/2006 |
| JP | 4082714 | 2/2008 |
| WO | 2005/078709 | 8/2005 |
| WO | 2006/033257 | 3/2006 |
| WO | 2007/108041 | 9/2007 |
| WO | 2007/139067 | 12/2007 |
| WO | 2008/026518 | 3/2008 |

OTHER PUBLICATIONS

Written Opinion issued Sep. 3, 2009 in International Application No. PCT/EP2008/006291.

Junyu Dong et al., "Super Resolution of 3D Surface Texture", International Conference on Computing Intelligence and Security Workshops, Dec. 15, 2007, pp. 279-282, XP002542481, IEEE, pp. 279-281; Figures 1-4.

Alexei A. Efros et al., "Texture Synthesis by Non-parametric Sampling", Computer Vision, 1999, The Proceedings of the Seventh IEEE International Conference on Kerkyra, Greece, Sep. 20-27, 1999, Los Alamitos, CA, USA, IEEE Comput. Soc., US, vol. 2, Sep. 20, 1999, pp. 1033-1038, XP010350534, ISBN: 978-0-7695-0164-2.

William T. Freeman et al., "Example-Based Super-Resolution", IEEE Computer Graphics and Applications, IEEE Service Center, New York, NY, US, vol. 22, No. 2, Mar. 1, 2002, pp. 56-65, XP011094241, ISSN: 0272-1716.

Won-Sook Lee et al., "Mesh resolution augmentation using 3D skin bank", Computer Aided Design, Elsevier Publishers BV., Barking, GB, vol. 39, No. 7, Jun. 7, 2007, pp. 610-621, XP022109490, ISSN: 0010-4485.

Tongbo Chen et al., "Mesostructure from Specularity", Proceedings of the 2006 IEEE Computer Society Conference on Computer Vision and Pattern Recognition, 2006.

Masatoshi Okutomi, "Stereo Vision" in "Computer Vision: Technology Review and Future Directions", Editors, Takashi Matsuyama et al., New Technology Communications, pp. 123-133, 1998 (with partial English translation).

Yoichi Sato et al., "Object Shape and Reflectance Modeling from Observation", Proceedings of ACM, SIGGRAPH 97, pp. 379-387, 1997.

Shogo Tokai et al., "A Method for Rendering Citrus Fruits with Computer Graphics", Journal of the Institute of Electronics, Information and Communication Engineers, J76-D-II, 8, pp. 1746-1754, 1993 (with partial English translation).

Andrew S. Glassner, "Cook Torrance Shading Model" in "Principles of Digital Image Synthesis", vol. 2, Morgan Kaufman Inc., 1995.

Shree K. Nayar et al., "Separation of Reflection Components Using Color and Polarization", International Journal of Computer Vision, No. 21, vol. 3, pp. 163-186, 1997.

Oana G. Cula et al., "Skin Texture Modeling", International Journal of Computer Vision Kluwer Academic Publishers Netherlands, vol. 62, No. 1-2, Apr. 2005, pp. 97-119.

Volker Blanz et al., "A Morphable Model for the Synthesis of 3D Faces", SIGGRAPH 1999.

Mark W. Powell et al., "A Simple Strategy for Calibrating the Geometry of Light Sources", IEEE Transaction on pattern analysis and machine intelligence, vol. 23, No. 9, Sep. 2001, pp. 1022-1027.

James T. Kajiya et al., "Rendering Fur With Three Dimensional Textures", SIGGRAPH, vol. 23, No. 3, Jul. 1989, pp. 271-280.

Yasuhiro Takagi, "Stereoscopic display reconstructing texture by high-density directionality display" in "Stereoscopic Technology—Cutting edge of 3D Vision, 3D Display, Autostereography and their Applications -", NTS Inc., Oct. 10, 2008, pp. 209-221 (with partial English translation).

\* cited by examiner

IMAGE GENERATION DEVICE AND IMAGE GENERATION METHOD FOR GENERATING A HIGH-QUALITY IMAGE BY USING INFORMATION FROM A LOW-QUALITY IMAGE

TECHNICAL FIELD

The present invention relates to image generation devices. More particularly, the present invention relates to a device that generates a high-quality image clearly showing a surface structure such as bumps on a surface of an object of the image by using a mesostructure of the surface structure, based on a geometric parameter regarding the surface structure which is generated from a low-quality image or the like of the same object, or that generates the image of the object under a pseudo light source emitting light from any desired position, while achieving the clear showing of the surface structure by using the mesostructure.

BACKGROUND ART

When an image of an object having a surface with bumps, such as a fruit, wood, or human skin, is captured by a low-quality image capturing device, or when the object has inadequate dimensions to be clearly image-captured, the bumps on the surface are often not shown in an image due to an insufficiency of resolution. Various solutions have been proposed to address this kind of problem. It is known from Patent Reference 1 to provide a method of (i) capturing a first image by a digital camera or the like and a higher-quality second image by zooming a portion of the first image, then (ii) learning a quality improvement function from a relationship between the first image and the second image, and (iii) applying the quality improvement function to the entire image. As a result, the entire image has higher quality and higher resolution. This method enables low-quality image capturing devices to generate an image with higher quality, reconstructing information of the bumps, which has been prevented from an insufficiency of resolution, using information generated from the second image.

Although the method disclosed in Patent Reference 1 achieves the image generation showing the bumps, the method fails image generation under a pseudo light source different from an actual light source. The image generation under a pseudo light source needs information regarding the surface structure of the object, more specifically, a geometric parameter regarding geometric normal of the object surface and a viewpoint. However, Patent Reference 1 does not disclose any method of estimating, from image data, a geometric parameter that is different from the image data. In the method of Patent Reference 1, the quality improvement function is assumed to be generated directly from the image data, although this method is not limited for image generation.

There is another method of generating a geometric parameter regarding a shape of an object using a range finder or the like, thereby obtaining a geometric parameter indicating a macro shape of the object. Unfortunately again, this method has problems in resolution and fineness. Reconstruction of fine-scale bumps on a surface of an object, such as fruit, wood, or human skin, needs highly complicated functions in a used device, which results in unrealistic size and cost especially in terms of usability.

On the other hand, Patent Reference 2 discloses a method capable of generating an image showing bumps on a surface of an object, and also capable of estimating, from image data, a geometric parameter that is not the image data itself but information regarding a geometric normal of the object surface. In the technique disclosed in Patent Reference 2, Torrance-Sparrow model indicating respective physical relationships between pixel values and geometric parameters regarding a viewpoint position, a light source position, and a geometric normal of the object surface is applied to an image of the object. Then, each difference between the result and an actual measurement value is modeled using Gaussian distribution. Here, the components modeled by Gaussian distribution can be considered as components having higher resolution. Therefore, addition of the components modeled by Gaussian distribution to an image without information of bumps on a surface of the object enables the image to show the bumps. Moreover, the use of the geometric parameter regarding a viewpoint position, a light source position, and a geometric normal of an object surface makes it possible to generate an image under a pseudo light source.

[Patent Reference 1] US Patent Application Publication No. 2006/0003328A1
[Patent Reference 2] Japanese Unexamined Patent Application Publication No. 2006-31595

DISCLOSURE OF INVENTION

Problems that Invention is to Solve

Unfortunately, the technology disclosed in Patent Reference 2 does not use information with medium level details regarding a surface structure such as bumps of especially fruits, wood, or human skin (Hereinafter, the information of the surface structure with medium level details is referred to as a "mesostructure"). Therefore, this conventional technology fails to generate an image more clearly showing the surface structure. The reason of the failure is given below. In the mesostructure, it can be considered that bumps having a spatial structure with medium level details are spatially distributed at random, as described in Non Patent Reference 1. The Gaussian model disclosed in Patent Reference 2 is, however, generated by modeling variations of pixel values according to a relationship between each pixel and the geometric parameter. Therefore, the technology disclosed in Patent Reference 2 cannot show the bumps having a spatial structure with medium level details, but merely shows a homogeneous rough surface or the like. As a result, when fruits, wood, or human skin is image-captured as an object, a surface of the object is seen to have a homogeneous rough surface that is different from the imaged generated by using mesostructure.

Thus, the present invention overcomes the problems of the conventional techniques as described above. It is an object of the present invention to provide an image generation device and an image generation method that are capable of generating an image of an object (i) with high quality more clearly showing a surface structure of the object by using a mesostructure of the surface structure and also (ii) under a pseudo light source emitting light from any desired position, based on a geometric parameter regarding the surface structure which is generated from a low-quality image of the object.

[Non Patent Reference 1] "Mesostructure from Specularity", Tongbo Chen, Michael Goesele, and Has-Peter Seidel; Proceedings of the 2006 IEEE Computer Society Conference on Computer Vision and Pattern Recognition, 2006

Means to Solve the Problems

In accordance with an aspect of the present invention for achieving the object, there is provided an image generation device that generates, based on information regarding a surface structure of a surface of an object, a high-quality image of the object more clearly showing the surface structure, the object of the high-quality image being illuminated by a light source and viewed from a viewpoint, the image generation device including: an information obtainment unit configured to obtain position information of the light source, position information of the viewpoint, and geometric normal information regarding the surface structure; a geometric parameter calculation unit configured to calculate a first geometric parameter regarding the surface structure, by performing a predetermined arithmetic operation using the position information of the light source, the position information of the viewpoint, and the geometric normal information, for each point of the surface corresponding to a pixel in the high-quality image; a high-resolution database unit in which an exemplum is stored, the exemplum being a geometric parameter that indicates a mesostructure of a portion of the surface and has a spatial resolution higher than a spatial resolution of the geometric normal information; an exemplum expansion unit configured to read out the exempla from the high-resolution database unit, and spatially increase the readout exempla so that a spatial region indicated by the readout exempla covers surface of the object in the high quality image; a geometric parameter modification unit configured to calculate a modified geometric parameter, by modifying the first geometric parameter using the region expanded by the exemplum expansion unit; and an image generation unit configured to calculate a pixel value of the each point by applying the modified geometric parameter to a reflection model for deciding the pixel value, and thereby generate the high-quality image.

With the above structure, the geometric parameter regarding the surface of the object is modified to have a higher resolution, and then the modified geometric parameter is used to generate a higher-quality output image. In addition, the geometric parameter indicates position information of a light source, and such a geometric parameter is applied to a reflection model to generate an image. This allows the light source to be virtually arranged at any desired position, which makes it possible to generate the image of the object under a pseudo light source emitting light from any desired position.

It should be noted that the present invention can be realized not only as the above image generation device, but also as: an image generation method including steps performed by the characteristic units of the image generation device: a program causing a computer to execute the characteristic steps of the image generation method; a computer-readable recording medium, such as a CD-ROM, in which the program is recorded; and the like.

Effects of the Invention

Accordingly, the present invention can generate an image of an object (a) with high quality more clearly showing a surface structure such as bumps on a surface of the object by using a mesostructure of the surface structure and also (b) under a pseudo light source emitting light from any desired position, based on a geometric parameter regarding the surface structure which is generated from a low-quality image of the object.

With the technology of the present invention, a resolution of an image captured by a digital camera or the like can be increased, and a pseudo image under a light source at a desired position can be generated. Therefore, the present invention is highly suitable for practical use in recent days digital cameras, security cameras, and the like have been widely used.

NUMERICAL REFERENCES

Figure 1:
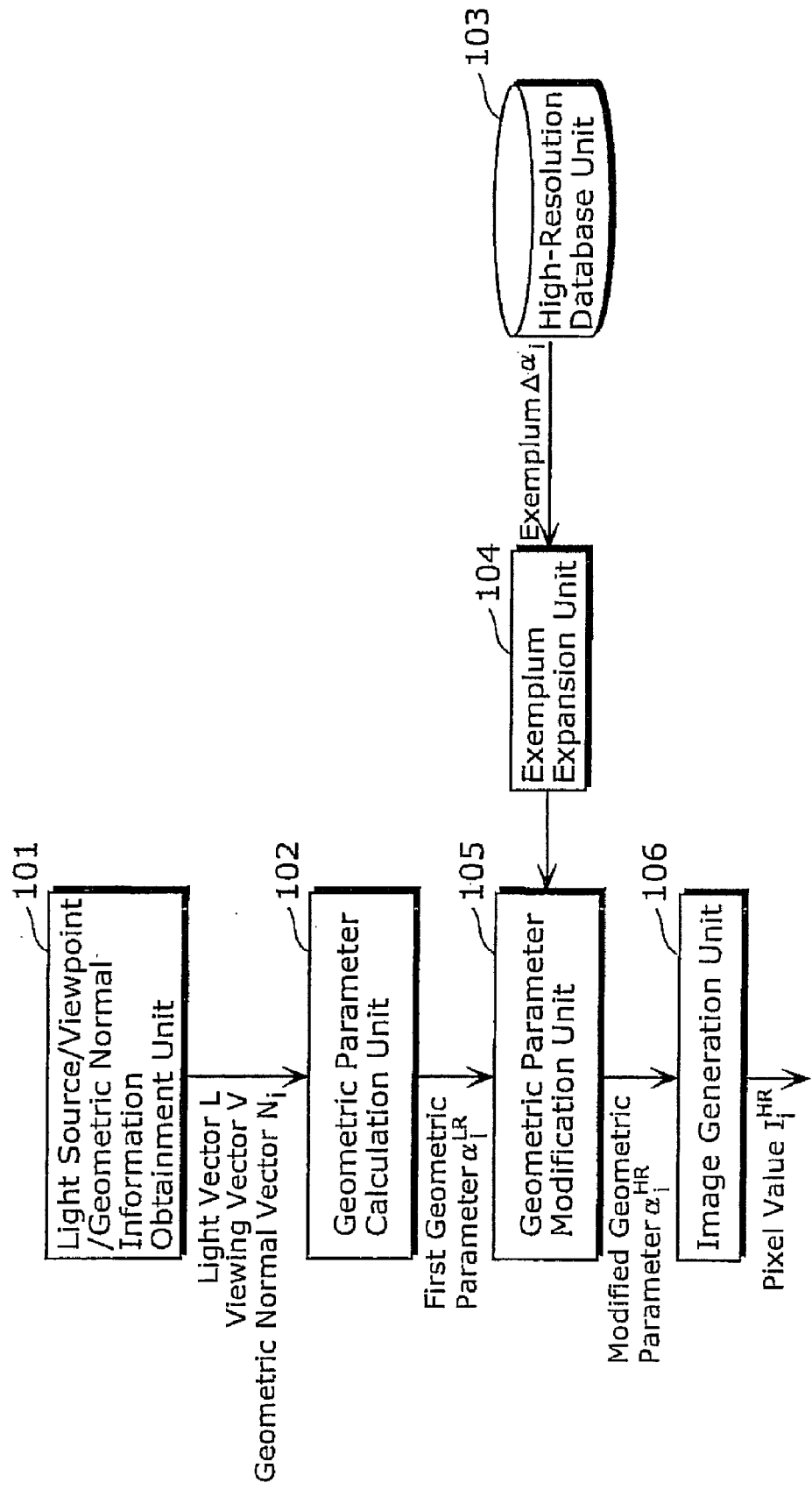
FIG. 1 is a diagram showing a basic structure of an image generation device according to a first embodiment of the present invention.

101, 101*a* light source/viewpoint/geometric normal information obtainment unit 102 geometric parameter calculation unit
103 high-resolution database unit
104 exemplum expansion unit
105 geometric parameter modification unit
106 image generation unit
601 first image capture unit
602 second image capture unit
603 second geometric parameter estimation unit
604 exemplum generation unit
1010 light source position change unit
1201 DS separation unit
1202 diffuse reflection image processing unit

BEST MODE FOR CARRYING OUT THE INVENTION

The first embodiment of the present invention is an image generation device that generates, based on information regarding a surface structure of a surface of an object, a high-quality image of the object more clearly showing the surface structure, the object of the high-quality image being illuminated by a light source and viewed from a viewpoint, the image generation device including: an information obtainment unit configured to obtain position information of the light source, position information of the viewpoint, and geometric normal information regarding the surface structure; a geometric parameter calculation unit configured to calculate a first geometric parameter regarding the surface structure, by performing a predetermined arithmetic operation using the position information of the light source, the position information of the viewpoint, and the geometric normal information, for each point of the surface corresponding to a pixel in the high-quality image; a high-resolution database unit in which an exemplum is stored, the exemplum being a geometric parameter that indicates a mesostructure of a portion of the surface and has a spatial resolution higher than a spatial resolution of the geometric normal information; an exemplum expansion unit configured to read out the exempla from the high-resolution database unit, and spatially increase the readout exempla so that a spatial region indicated by the readout exempla covers surface of the object in the high quality image; a geometric parameter modification unit configured to calculate a modified geometric parameter, by modifying the first geometric parameter using the region expanded by the exemplum expansion unit; and an image generation unit configured to calculate a pixel value of the each point by applying the modified geometric parameter to a reflection model for deciding the pixel value, and thereby generate the high-quality image. With the above structure, high-resolution components to be used to reconstruct mesostructure are held as exempla in a database, and then the exempla are increased to spatially expand a region (hereinafter, referred to also as an "exemplum map") indicated by the exempla. Thereby, the image generation device according to the present invention can generate a high-quality image of the object more clearly showing a surface structure such as bumps on a surface of the object by using a mesostructure of the surface structure, based on information regarding the surface structure which is generated from a low-quality image of the same object. In addition, (i) a geometric parameter calculated from geometric normal information of each point of the object surface, (ii) position information of a light source, and (iii) position information of a viewpoint are applied to a reflection model to generate an image, which makes it possible to set the position of the light source to any desired position. Thereby, the image generation device according to the present invention can generate the image of the object under a pseudo light source emitting light from a desired position.

Furthermore, an example of the geometric parameter is a value of an angle between (i) a half vector generated by adding a unit vector indicating a direction of the light source with a unit vector indicating a direction of the viewpoint and (ii) a geometric normal vector of a point corresponding to the first geometric parameter.

Here, it is preferable that the information obtainment unit is configured to obtain the geometric normal information, by calculating the geometric normal information from the information which is generated by one of a stereo camera, a range finder, and another shape detection device which capture an image of the object. With the above structure, the generation of the first geometric parameter using a stereo camera, a range finder, or another shape detection means realizes generation of a geometry information indicating a macrostructure such as a gross shape of the entire image of the object. The exempla equivalent to separately-obtained high-resolution components are increased to expand an exemplum map to cover the overall object. Thereby, the image generation device according to the present invention can generate a high-quality image of the object clearly showing a surface structure such as bumps on a surface of the object by using the mesostructure. In addition, while clearly showing the surface structure such as bumps by using the mesostructure, it is possible to generate an image of the object under a pseudo light source emitting light from any desired position.

It is still preferable that the reflection model is a mathematical expression for calculating a pixel value of a point in the high-quality image using the geometric normal information, the position information of the viewpoint, and a geometric parameter which are regarding the point, and that the image generation unit is configured to calculate the pixel value of the each point, by applying, to the reflection model, the geometric normal information and the position information of the viewpoint which are obtained by the information obtainment unit in addition to the modified geometric parameter. With the above structure, a parameter of the reflection model regarding the position of the light source can be changed. Thereby, the image generation device according to the present invention can generate an image of the object under a pseudo light source emitting light from any desired position, while clearly showing a surface structure such as bumps on a surface of the object by using the mesostructure.

It is still preferable that the image generation device further includes a first image capture unit configured to generate a first image, by capturing an image of the object; a second image capture unit configured to generate a second image, by capturing an image of a portion of the object with a resolution higher than a resolution of the first image, the portion corresponding to a highlight region of the first image to have higher quality in the high-quality image; a second geometric parameter estimation unit configured to estimate a second geometric parameter using as an objective function a pixel value of the second image generated by the second image capture unit, the second geometric parameter indicating the surface structure of the surface of the object; and an exemplum generation unit configured to set the second geometric parameter estimated by the second geometric parameter estimation unit to the exemplum, and store the exemplum into the high-resolution database unit. With the above structure, an image corresponding to the highlight region is captured to have high quality, and from the resulting image, a geometric parameter capable of indicating the mesostructure is estimated. Thereby, it is possible to generate a high-quality image of the object more clearly showing a surface structure such as bumps on a surface of the object by using the mesostructure, based on information regarding the surface structure which is generated from the low-quality object.

It is still preferable that the second image capture unit is configured to generate the second image, by capturing an image of the portion to be zoomed more than the capturing of the first image. With the above structure, use of a camera having a zooming function makes it possible to utilize a system simpler than a system including two cameras, in order to generate a high-quality image of the object more clearly showing a surface structure such as bumps on a surface of the object by using the mesostrucutre. In addition, while clearly showing the surface structure such as bumps by using the mesostructure, it is possible to generate an image of the object under a pseudo light source emitting light from any desired position.

It is still preferable that the information obtainment unit is configured to obtain plural pieces of the position information of the light source, that the geometric parameter calculation unit is configured to calculate the first geometric parameter for each of the plural pieces of the position information of the light source obtained by the information obtainment unit; that the geometric parameter modification unit is configured to calculate the modified geometric parameter for each of the plural pieces of the position information of the light source obtained by the information obtainment unit; and that the image generation unit is configured to generate the high-quality images for the plural pieces of the position information of the light source obtained by the information obtainment unit, respectively. With the above structure, for each of changing positions of the light source, the first geometric parameter is calculated, then the modified geometric parameter is calculated, and eventually the image is generated. Thereby, while clearly showing the surface structure such as bumps by using the mesostructure, it is possible to generate a plurality of consecutive images of the object under pseudo light sources emitting light from any desired positions.

It is still preferable that the image generation device further includes a first image capture unit configured to generate a first image, by capturing an image of the object; and a separation unit configured to separate the first image generated by the first image capture unit into specular reflection components and diffuse reflection components, wherein the geometric parameter calculation unit, the exemplum expansion unit, the geometric parameter modification unit, and the image generation unit perform the calculating of the first geometric parameter, the reading out and the increasing, the calculating of the modified geometric parameter, and the calculating of the pixel value and the generating, respectively, for the specular reflection components separated by the separation unit, and the image generation unit is configured to further synthesize (i) an image using the high-quality specular reflection components generated by the image generation unit with (ii) an image using the diffuse reflection components separated by the separation unit. With the above structure, the input image is separated into diffuse reflection components and specular reflection components, and the reflection model is applied to the specular reflection components to increase quality of the image. This means that the reflection model is applied only to image components for which the reflection model is originally to be applied (namely, specular reflection components). Thereby, it is possible to generate a high-quality image of the object more correctly and clearly showing a surface structure such as bumps on a surface of the object by using the mesostructure. In addition, while clearly showing the surface structure such as bumps by using the mesostructure, it is possible to generate an image of the object under a pseudo light source emitting light from any desired position.

It is still preferable that the image generation device further includes an exemplum generation unit configured to obtain computer graphics data indicating the surface structure, generate the exempla from the computer graphics data, and store the exempla into the high-resolution database unit. With the above structure, it is possible to generate a high-quality image of the object more clearly showing a surface structure such as bumps on a surface of the object by using artificially generated data, based on information regarding the surface structure which is generated from a low-quality image of the object.

The following describes embodiments according to the present invention with reference to the drawings.

First Embodiment

Firstly, an image generation device and an image generation method according to the first embodiment of the present invention are described. FIG. 1 is a diagram showing a structure of the image generation device according to the first embodiment of the present invention. The image generation device of FIG. 1 generates a high-quality image of an object more clearly showing a surface structure such as bumps on a surface of the object by using a mesostructure of the surface structure, based on information regarding the surface structure which is generated from a low-quality image of the object. In order to achieve the above generation of the high-quality image, the image generation device of FIG. 1 holds high-resolution components to be used to reconstruct the mesostructure, as exempla, in a database, and spatially increases the exempla to expand an exemplum map. The image generation device of FIG. 1 includes a light source/viewpoint/geometric normal information obtainment unit 101, a geometric parameter calculation unit 102, a high-resolution database unit 103, an exemplum expansion unit 104, a geometric parameter modification unit 105, and an image generation unit 106. Here, the object of the image generated by the image generation device is assumed to be illuminated from a certain light source and viewed from a certain viewpoint.

The light source/viewpoint/geometric normal information obtainment unit 101 obtains (i) position information of the light source and (ii) position information of a camera or position information of the viewpoint regarding the image generation device, and calculates (iii) information of a geometric normal (hereinafter, referred to also as "geometric normal information") of a surface of the object (hereinafter, referred to as an "object surface") from information obtained by a range finder, a stereo camera, or the like.

The geometric parameter calculation unit 102 calculates a geometric parameter indicating a macrostructure such as a gross shape of the object (in other words, the geometric parameter is generated from a low-quality image of the object), from the position information of the light source, the position information of the viewpoint, and the geometric normal information which have been obtained by the light source/viewpoint/geometric normal information obtainment unit 101. Here, it can be assumed that the generated parameter does not have enough resolution to reconstruct the mesostructure.

The high-resolution database unit 103 is a database in which exempla are stored. Each of the stored exempla is a different high-quality geometric parameter that indicates a mesostructure of a portion of the object surface and has a spatial resolution higher than a spatial resolution of the geometric normal information calculated by the light source/viewpoint/geometric normal information obtainment unit 101. In the first embodiment, the high-quality geometric parameters corresponding to the high-resolution components including the mesostructure components of the image are held as the exempla in a two-dimensional block form that is an exemplum map. Here, the exemplum map is not limited to a square or a rectangular.

The exemplum expansion unit 104 reads out the exempla from the high-resolution database unit 103, and then increases the readout exempla in order to expand a spatial region (exemplum map) indicated by the readout exempla to cover the object surface. In the first embodiment, the dimensions of the exemplum map is spatially expanded to fill the dimensions of the output image, or the dimensions of a target region of the object. Thereby, even if the dimensions of the exemplum map is smaller than the dimensions of the image, the mesostructure can be reconstructed over the entire image.

The geometric parameter modification unit 105 modifies the geometric parameter calculated by the geometric parameter calculation unit 102, by adding the geometric parameter with information indicating the high-resolution component having the mesostructure component spatially expanded by the exemplum expansion unit 104. This means that, the information indicating the mesostructure components are added even to the geometric parameters that have been calculated by the geometric parameter calculation unit 102 and do not indicate the mesostructure due to an insufficient resolution of the range finder, a stereo camera, or the like.

The image generation unit 106 calculates a pixel value of each point of the output image, using the modified geometric parameter for a reflection model that is a relational expression for deciding the pixel value from the modified geometric parameter, thereby generating the output image to have higher quality including the mesostructure components.

With the above structure, the image generation device according to the first embodiment can generate a high-quality image including mesostructure components, even from a low-quality input image that does not include the mesostructure components.

It should be noted that the elements included in the image generation device (namely, the geometric parameter calculation unit 102, the high-resolution database unit 103, the exemplum expansion unit 104, the geometric parameter modification unit 105, and the image generation unit 106) can be realized as software such as a program that is executed in a computer having a central processing unit (CPU), a random access memory (RAM), a read-only memory (ROM), a communication interface, an input/output port, a hard disk, a display, and the like, or can be realized as a hardware such as an electronic circuit. The same goes for image generation devices according to other embodiments of the present invention.

Figure 2:
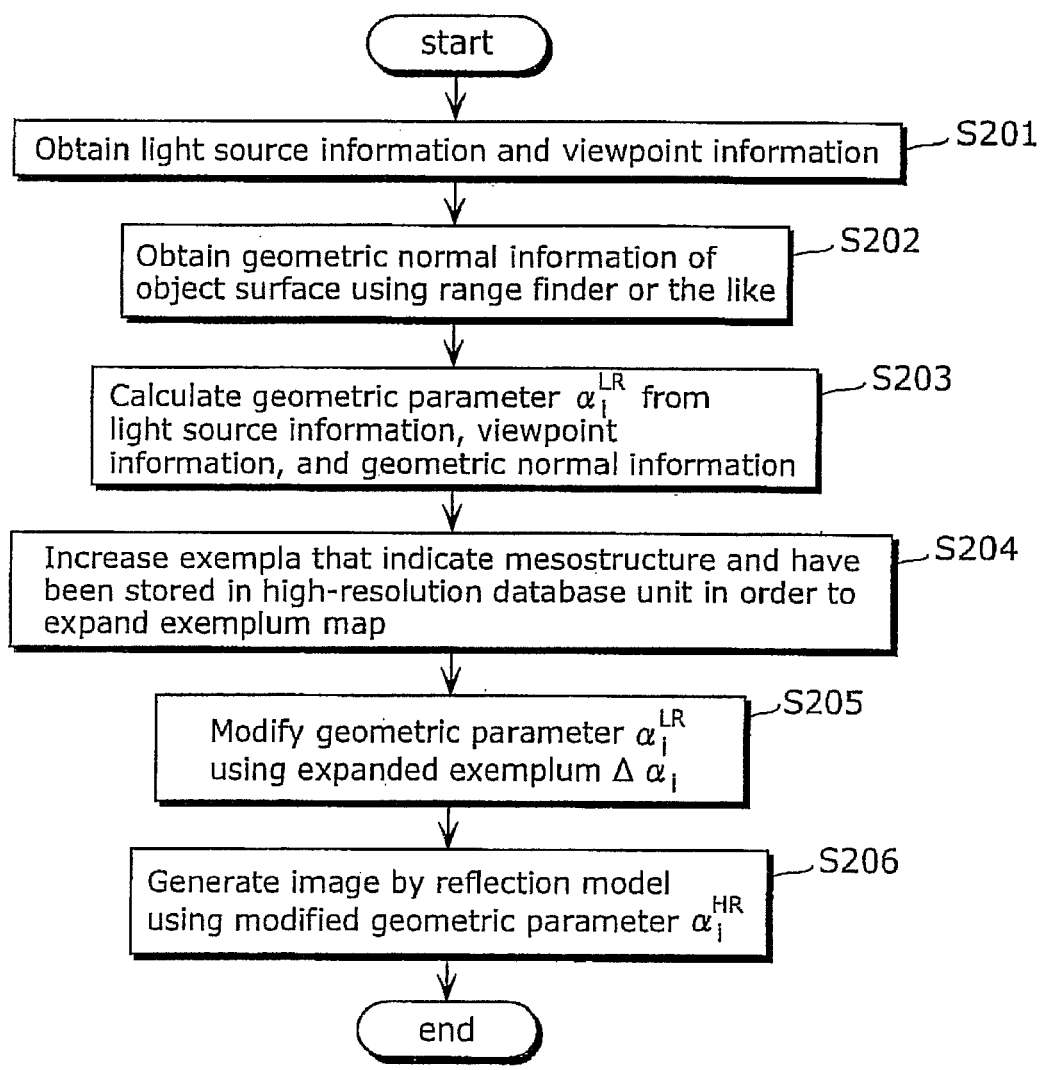
FIG. 2 is a flowchart showing basic processing performed by the image generation device according to the first embodiment of the present invention.
Figure 3:
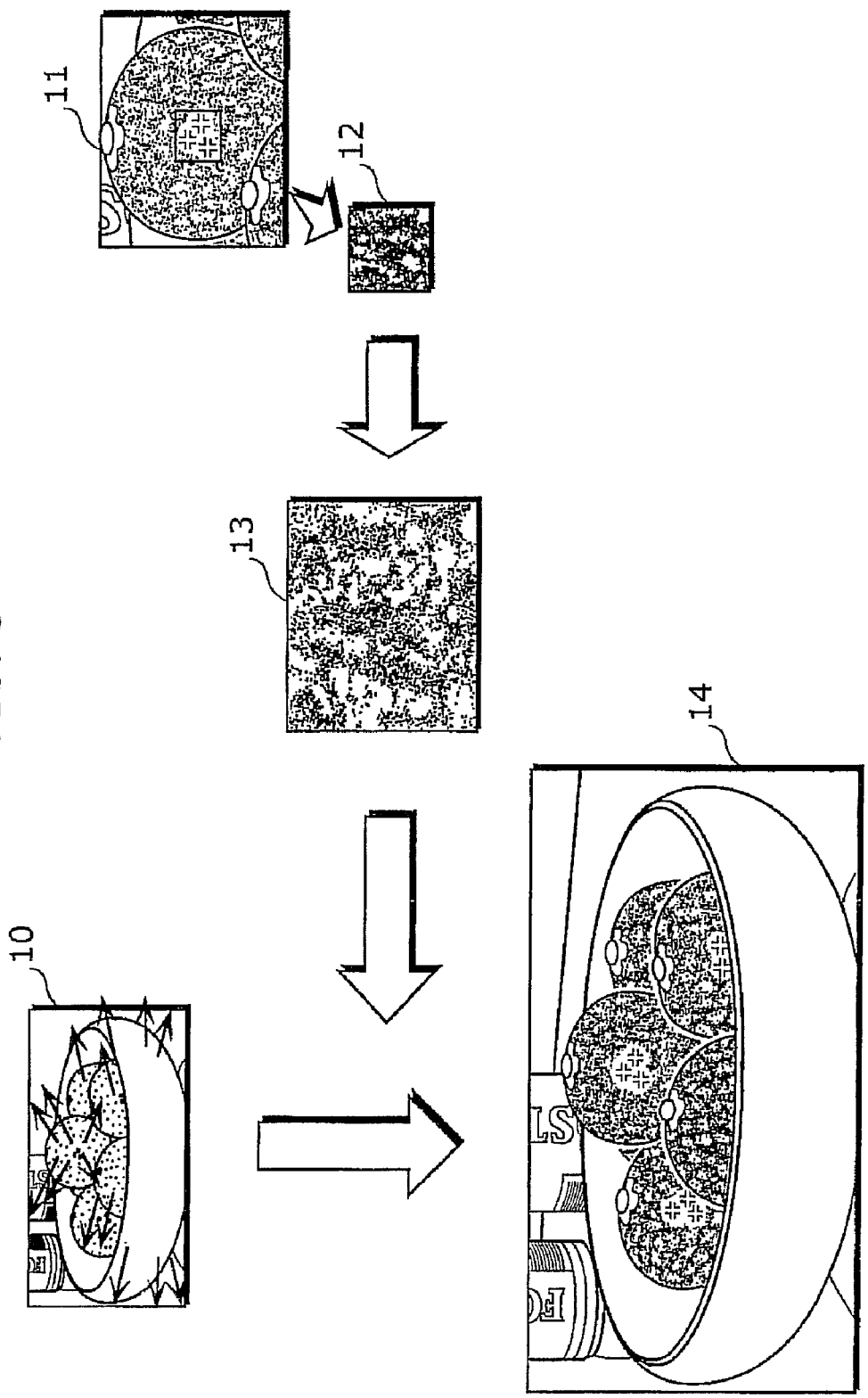
FIG. 3 is a schematic diagram showing information and an image generated by the image generation device according to the first embodiment of the present invention.

The following describes processing performed by the image generation device having the above structure according to the first embodiment of the present invention (namely, an image generation method according to the first embodiment), with reference to a flowchart of FIG. 2 and schematic diagrams of information and images of FIG. 3. In the image generation method according to the first embodiment, a high-quality image of an object more clearly showing a surface structure such as bumps on a surface of the object is generated based on information regarding the surface structure which is generated from a low-quality image of the object.

Firstly, at Step S201, the light source/viewpoint/geometric normal information obtainment unit 101 obtains (i) a light vector L from a position of a setting light source, and (ii) a viewing vector V from a position of a setting camera. Here, the viewing vector, the light vector, and a below-described geometric normal information regarding a surface structure of an object may be artificially generated with computer graphics (CG) or the like, as far as they can be obtained. If they are such artificial data, the following Step S201 and S202 are eliminated.

Next, at Step S202, the light source/viewpoint/geometric normal information obtainment unit 101 calculates geometric normal information (refer to geometric normal information 10 in FIG. 3) regarding a surface of the object, from information obtained by a stereo camera, a range finder, or the like.

More specifically, when a stereo camera is used, a 3-dimensional position of each point of the object surface is determined from two images using a method disclosed in Non Patent Reference 2. Next, a geometric normal vector $N_i$ at a point i on the object surface is calculated from at least three 3-dimensional positions A, B, and C, using the following Equation 1.

$$N_i = \overline{AB} \times \overline{AC} \qquad \text{(Equation 1)}$$

where × represents an outer product. Of course, as far as the geometric normal vector regarding the surface structure can be calculated, the method of calculating the geometric normal information is not limited to the above.

[Non Patent Reference 2] "Computer Vision: Technology Review and Future Directions", Takashi Matsuyama, Yoshinori Kuno, and Jyun Imiya, New Technology Communications, pp. 123-133, 1998

On the other hand, when a range finder is used, a geometric normal vector $N_i$ on the object surface can be calculated using a method disclosed in Non Patent Reference 3.

[Non Patent Reference 3] "Object Shape and Reflectance Modeling from Observation", Yoichi Sato, Mark D. Wheeler, and Katsushi Ikeuchi, Proceedings of ACM, SIGGRAPH 97, pp. 379-387, 1997

Figure 4:
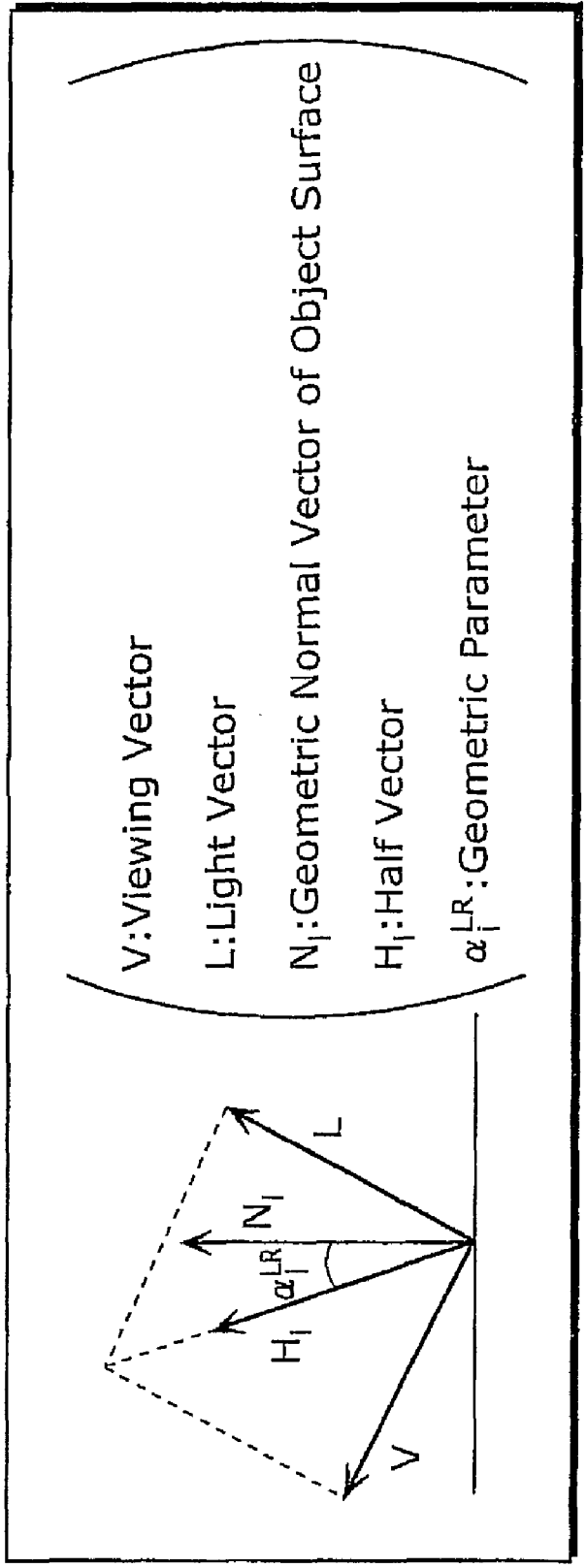
FIG. 4 is a graph showing one example of a geometric parameter according to the first embodiment of the present invention.

Next, at Step S203, the geometric parameter calculation unit 102 calculates a geometric parameter regarding the surface structure from the position information of the light source, the position information of the viewpoint, and the geometric normal information which have been obtained by the light source/viewpoint/geometric normal information obtainment unit 101. This geometric parameter directly influences a brightness value of the output image. Therefore, the geometric parameters can be used to change respective pixel values depending on the surface structure such as mesostructure of the surface of the object. As shown in FIG. 4, if a position of the light source and a position of the viewpoint are known, the geometric parameter $\alpha_i^{LR}$ regarding the surface structure of the object is calculated from the viewing vector V and the light vector L which have been obtained at Step S201, using the following Equation 2.

$$\alpha_i^{LR} = \arccos(N_i \cdot H) \qquad \text{(Equation 2)}$$

Here, H is determined by the following Equation 3. In Equation 3, it is assumed that the viewing vector V and the light vector L are away from the object enough not to depend on a point i on the object surface.

[Equation 3]

$$H = \frac{0.5(L+V)}{\|0.5(L+V)\|} \qquad \text{(Equation 3)}$$

As obvious from the above Equations 2 and 3, this geometric parameter is a value (accoos) of an angle between (i) a half vector generated by adding a unit vector indicating a direction of the light source with a unit vector indicating a direction of the viewpoint and (ii) a geometric normal vector of a point corresponding to the geometric parameter.

As described above, the geometric parameter calculation unit 102 calculates the geometric parameter $\alpha_i^{LR}$ regarding the surface structure of the object, for each point i on the output image. Here, the generated geometric parameter $\alpha_i^{LR}$ does not indicate the mesostructure, since the information regarding the surface structure which is obtained by a range finder, a stereo camera, or the like and then used to generate the geometric parameter $\alpha_i^{LR}$ has a low resolution or low fineness. It should be note that lowpass filtering may be spatially applied to the calculated geometric parameter $\alpha_i^{LR}$ in order to cancel noise.

Figure 5A:
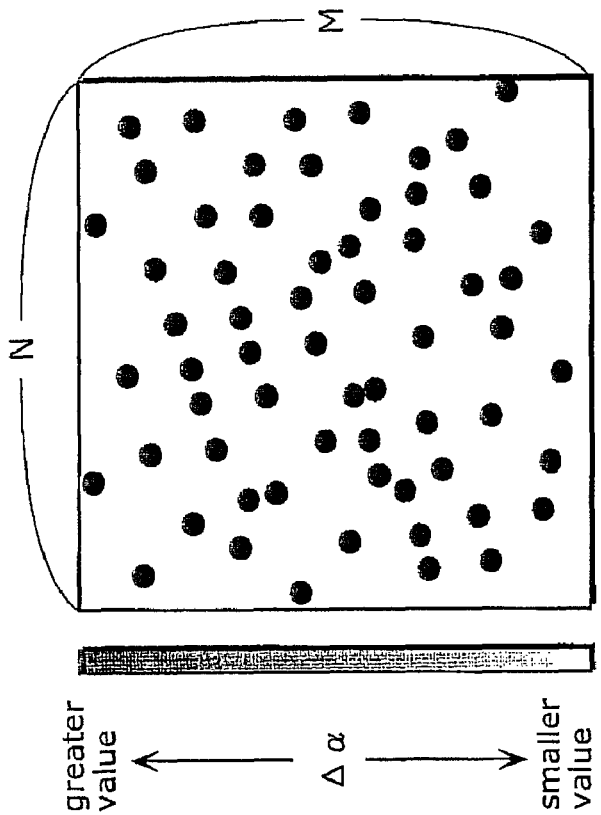
FIG. 5A is a schematic diagram showing one example of an exemplum map according to the first embodiment of the present invention.
Figure 5B:
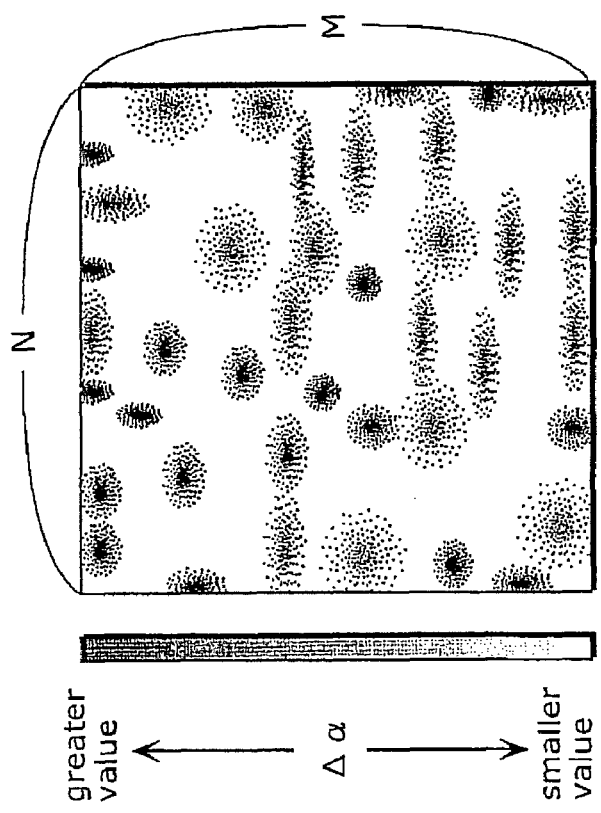
FIG. 5B is a schematic diagram showing one example of an exemplum map of the prior art.

Next, at Step S204, since the exempla of the exemplum map (refer to a high-resolution image 11 and an exemplum map 12 in FIG. 3) have previously been stored in the high-resolution database unit 103, the exemplum expansion unit 104 reads out the exempla from the high-resolution database unit 103, and increases the readout exempla to spatially expand the exemplum map indicated by the readout exempla (refer to an expanded exemplum map 13 in FIG. 3). Here, each of the exempla is a high-quality geometric parameter that indicates the mesostructure of a portion of the object surface. The high-quality geometric parameter has a spatial resolution higher than a spatial resolution of the geometric normal information calculated by the light source/viewpoint/geometric normal information obtainment unit 101. In the first embodiment, the exempla are referred to as geometric parameters $\Delta\alpha_i$ that indicate not pixel values but high-resolution components having the mesostructure components in an exemplum map having dimensions of N×M, as shown in FIG. 5A. It should be noted that the dimensions of the exemplum map may be smaller than the dimensions of the input image. In FIG. 5A, a darker portion shows a greater value of the geometric parameter $\Delta\alpha_i$. In the technique disclosed in Patent Reference 2, the information of the surface structure such as bumps is indicated by distribution of points using Gaussian model. Therefore, the technique disclosed in Patent Reference 2 indicates the bump information merely by existence of points as shown in FIG. 5B, but fails to indicate a structure (consecution) having the spatial dimensions of the image of the object, such as mesostructure. However, the first embodiment of the present invention can solve the above problem of the conventional technology, indicating the mesostructure by the exemplum map in a two-dimensional map having dimensions of N×M. It should be noted that the exempla may be previously obtained by a method described later in the second embodiment and then stored into the high-resolution database unit 103, or may be artificially generated with computer graphics. The method of artificially generating mesostructure with computer graphics model is disclosed in Non Patent Reference 4.

[Non Patent Citation 4] "A Method for Rendering Citrus Fruits with Computer Graphics", Shogo Tokai, Makoto Miyagi, Takami Yasuda, Shigeki Yokoi, and Jun-ichiro Toriwaki, Journal of the Institute of Electronics, Information and Communication Engineers, J76-D-II, 8, pp. 1746-1754, 1993

Next, when the dimensions of the exemplum map is smaller than the dimensions of the output image or the dimensions of the object, the exemplum map as shown in FIG. 5A is spatially expanded to fill the dimensions of the output image. It should be noted that the exempla may be increased in order to expand the exemplum map to fill the dimensions of a target region of the object, when the target region is known. For example, the image generation device may further include a processing unit of receiving an input image in addition to the light source/viewpoint/geometric normal information obtainment unit 101, and when color of the object is known the input image is segmented based on a color feature amount to specify a region of the object. Even if there is no such a processing unit of receiving the input image, consecution of the geometric normal information of the object is detected to estimate the region. Thereby, it is possible to increase the exempla to expand the exemplum map over the region. The above description has been given assuming that the entire object is covered with homogeneous mesostructure. However, if the object is made of two different kinds of materials, exempla may be increased in order to expand an exemplum map to cover a region of a corresponding target material using a physical value (for example, a parameter m in Equation 8 as described below) indicating a difference in the materials. The increase of exempla for spatial expansion of the exemplum map is performed by increasing components of the mesostructure in the exemplum map to cover the entire object or the entire image. Therefore, the increase of exempla needs keeping of spatial statistical characteristics of geometric parameters $\Delta\alpha_i$ indicating high-resolution components including the mesostructure in the exemplum map. Here, the spatial statistical characteristics mean a dispersion state of spatial arrangements of mesostructure components that are information having medium level details regarding the surface structure such as bumps. The method of the exempla increase while keeping the spatial statistical characteristics of the geometric parameters $\Delta\alpha_i$ indicating high-resolution components including mesostructure is disclosed in Non Patent Reference 5.

[Non Patent Reference 5] "Texture Synthesis by Nonparametric Sampling" Alexei A Efros and Thomas K Leung, IEEE International Conference on Computer Vision, 1999

Figure 6:
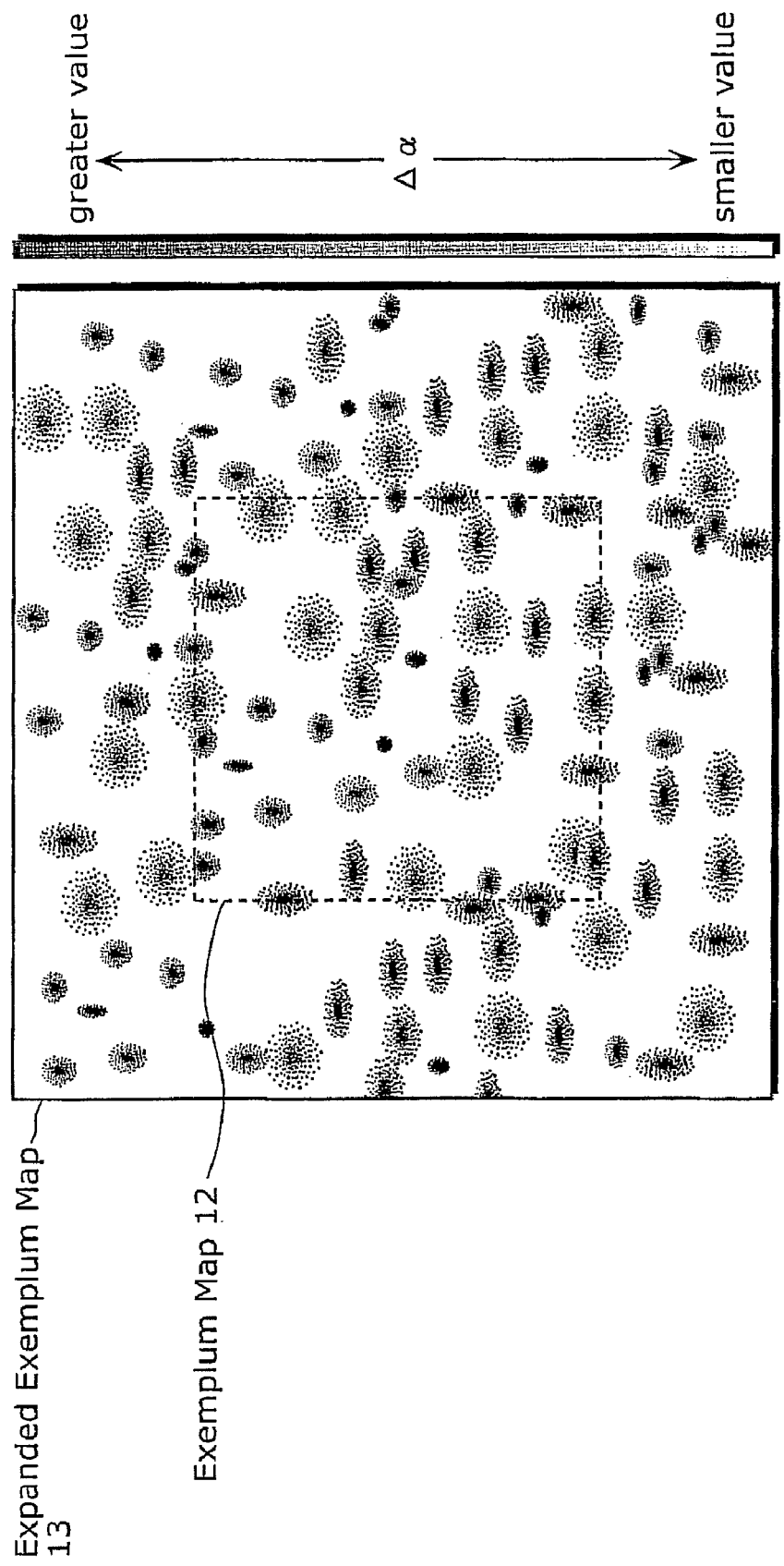
FIG. 6 is a schematic diagram showing one example of an expanded exemplum map according to the first embodiment of the present invention.

The technique disclosed in Non Patent Reference 5 can achieve the spatial expansion so that the increased exempla of the expanded exemplum map has the same characteristics as the original exempla, as shown in FIG. 6. Although in the technique of Non Patent Reference 5 an image is expanded based on a spatial distribution of pixel values in a small region, the image generation device according to the first embodiment is characterized in increasing geometric parameters (exempla) $\Delta\alpha_i$ indicating high-resolution components including the mesostructure in order to spatially expand the exemplum map indicated by the exempla, based on spatial distribution of the geometric parameters $\Delta\alpha_i$. The conventional image expansion based on pixel values cannot achieve image generation under a pseudo light source, due to direct influence of a position of a real-world light source. On the other hand, in the present invention, the use of the geometric parameters $\Delta\alpha_i$ indicating high-resolution components including the mesostructure makes it possible to change respective brightness values of the output image depending on a position of a pseudo light source. Thereby, while eliminating influence of the real-world light source, the image generation device according to the first embodiment can generate images under respective pseudo light sources.

Next, at Step S205, the geometric parameter modification unit 105 modifies the geometric parameter $\alpha_i^{LR}$ calculated at Step S203, by adding the geometric parameter $\alpha_i^{LR}$ with the spatially expanded geometric parameter $\Delta\alpha_i$ indicating a mesostructure component, using the following Equation 4.

$$\alpha_i^{HR} = \alpha_i^{LR} + \Delta\alpha_i \qquad \text{(Equation 4)}$$

Of course, weighting or noise cancellation such as smoothing may be performed for the geometric parameter $\Delta\alpha_i$.

Thereby, geometric parameters including mosostructure components can be obtained from geometric parameters not including the mesostructure components.

Next, at Step S206, the image generation unit 106 generates an image (refer to an output image 14 in FIG. 3) by applying the modified geometric parameter $\alpha_i^{HR}$ modified by the Equation 4 to a reflection model. In more detail, in one example of the reflection model, a pixel value to be in the output image is determined by the following Equation 5.

[Equation 5]

$$I^{HR} = k\frac{FDG}{\pi \cdot N \cdot V} \qquad \text{(Equation 5)}$$

where k is a constant number, F is a Fresnel reflection coefficient, D is a distribution function regarding roughness of the object surface, and G is a geometry attenuation coefficient. In addition, N and V are the geometric normal vector and the viewing vector shown in FIG. 4, respectively. Torrance-Sparrow model or Cook-Torrance model may be used for D. When Torrance-Sparrow model is used, D is determined by the following Equation 6.

$$D = k\exp(-\alpha_i^{HR^2}/m^2) \qquad \text{(Equation 6)}$$

When Cook-Torrance model is used, D is determined by the following Equation 7.

[Equation 7]

$$D = k\frac{\exp(-\tan^2(\alpha_i^{HR})/m^2)}{m^2\cos^4(\alpha_i^{HR})} \qquad \text{(Equation 7)}$$

It should be noted that the reflection model is described in more detail in Non Patent Reference 6, pp. 731-739. Here, in the Equations 5 to 7, a designer of the image generation device may set a necessary parameter to generate an image. Or, using a simpler equation such as the following Equation 8, the image generation may be performed by determining D using Torrance-Sparrow model shown in Equation 6 and setting G=1.

[Equation 8]

$$I_i^{HR} = k\frac{\exp(-\alpha_i^{HR^2}/m^2)}{N \cdot V} \qquad \text{(Equation 8)}$$

where m is a coefficient of surface roughness in Torrance-Sparrow model. Since m depends on a kind of the object, a value of m may be previously held, or the image generation may be performed setting m to a certain value such as 0.1. In addition, the parameter m may be estimated from an image.

[Non Patent Reference 6] "Principles of Digital Image Synthesis", Andrew S. Glassner, Vol. 2, Morgan Kaufman Inc., 1995

As described above, the image generation device and the image generation method according to the first embodiment holds, as exempla, high-resolution components that are used to reconstruct the mesostructure, and then increased in order to spatially expand a region (exemplum map) indicated by the exempla. Thereby, the image generation device and the image generation method according to the first embodiment can generate a high-quality image of an object more clearly showing a surface structure such as bumps on a surface of the object, based on geometric parameters regarding the surface structure which is generated from a low-quality image or the like of the object. In addition, the geometric parameter reflects information of a position of a light source, and such a geometric parameter is applied to a reflection model to generate an image. This means that the image generation device and the image generation method according to the first embodiment can set a light source at any desired position, which makes it possible to generate an image of the object under a pseudo light source emitting light from any desired position.

Second Embodiment

Figure 7:
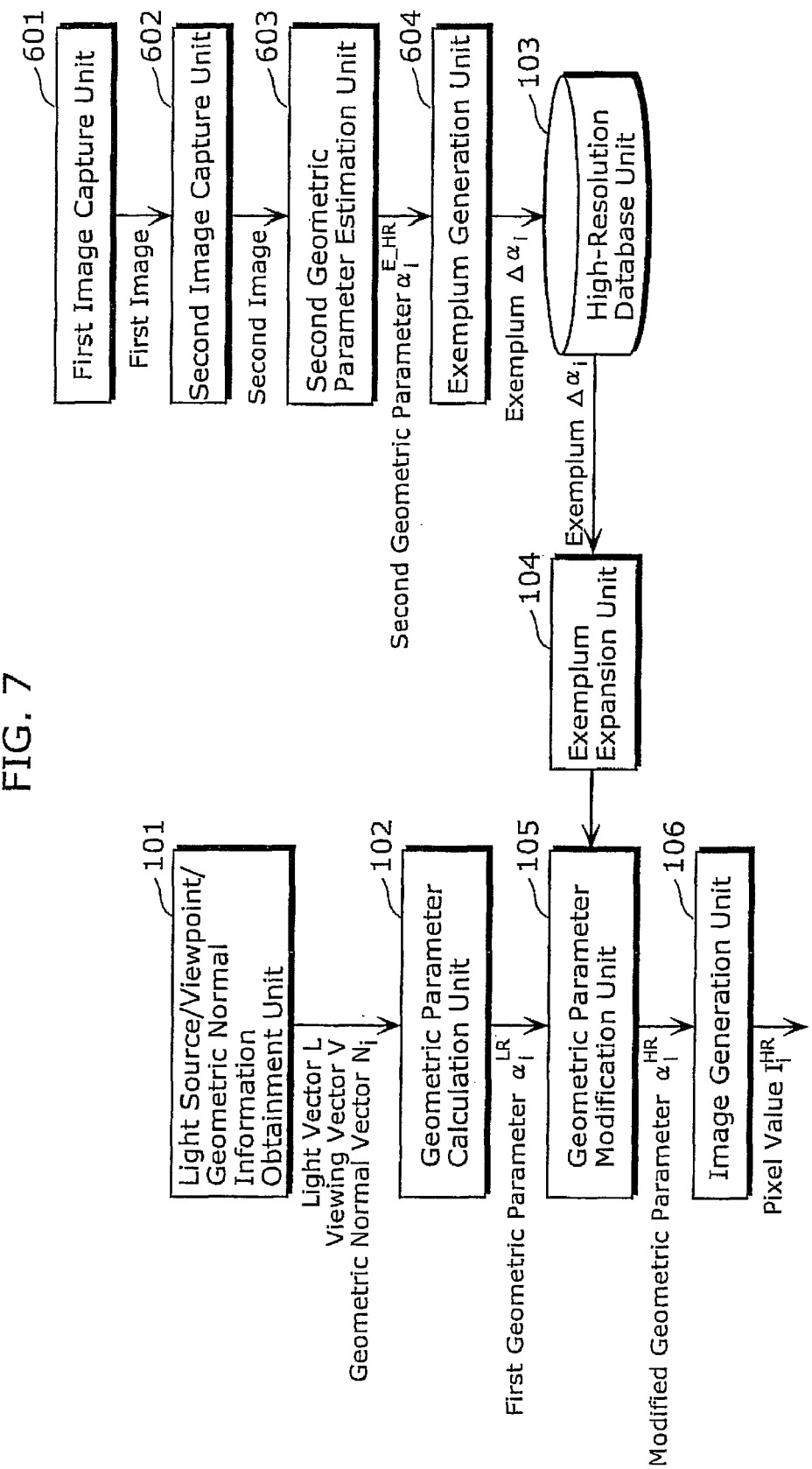
FIG. 7 is a diagram showing a basic structure of an image generation device according to a second embodiment of the present invention.

The following describes an image generation device and an image generation method according to the second embodiment with reference to the drawings. FIG. 7 is a diagram showing a structure of the image generation device according to the second embodiment. The image generation device of FIG. 7 generates a high-quality image of an object more clearly showing a surface structure such as bumps on a surface of the object, based on information regarding the surface structure which is generated from a low-quality image of the object. In order to achieve the above generation of the high-quality image, the image generation device of FIG. 7 captures a higher-quality image of the object corresponding to a highlight region of the low-quality image of the object using a zooming function of a camera or the like, then from the higher-quality image, geometric parameters of high-resolution components indicating the mesostructure are estimated as exempla, and then the exempla are increased to spatially expand a region indicated by the exempla. The image generation device of FIG. 7 includes the light source/viewpoint/geometric normal information obtainment unit 101, the geometric parameter calculation unit 102, the high-resolution database unit 103, the exemplum expansion unit 104, the geometric parameter modification unit 105, the image generation unit 106, a first image capture unit 601, a second image capture unit 602, a second geometric parameter estimation unit 603, and an exemplum generation unit 604. The structure of the image generation device according to the second embodiment as shown in FIG. 7 differs from the structure of the image generation device according to the first embodiment as shown in FIG. 1 in further including the first image capture unit 601, the second image capture unit 602, the second geometric parameter estimation unit 603, and the exemplum generation unit 604. Here, the same reference numerals of FIG. 1 are assigned to the identical units of FIG. 7, so that the identical units are not explained again below.

The first image capture unit 601 captures one or more images of an object. On example of the first image capture unit 601 is a digital camera. The captured images do not necessarily include high-resolution components indicating mesostructure. Hereinafter, the image captured by the first image capture unit 601 is referred to as a first image.

The second image capture unit 602 captures an image of a portion of the object with higher quality (namely, higher resolution). Here, the portion of the object corresponds to a highlight region of the image (first image) captured by the first image capture unit 601. Thereby, the captured higher-quality image indicates the mesostructure. Hereinafter, the image captured by the second image capture unit 601 is referred to as a second image.

The second geometric parameter estimation unit 603 estimates a second geometric parameter that indicates the surface structure of the object, using a pixel value of the second image captured by the second image capture unit 602 as an objective function. In other words, in the second embodiment, the second geometric parameter estimation unit 603 estimates the second geometric parameter indicating the surface structure of the object, from the second image captured by the second image capture unit 602 using a reflection model. The second geometric parameters include mesostructure components.

The exemplum generation unit 604 calculates high-resolution components including mesostructure components, from the second geometric parameters which include mesostructure components and are estimated by the second geometric parameter estimation unit 603. Then, the exemplum generation unit 604 generates exempla indicating an exemplum map in a two-dimensional block, and stores the generated exempla into the high-resolution database unit 103. Here, the exemplum map is not limited to a square or a rectangular.

The exemplum expansion unit 104 reads out the exempla from the high-resolution database unit 103, and increases the readout exempla in order to spatially expand a region (exemplum map) indicated by the readout exempla to fill the dimensions of a region of the object in the first image captured by the first image capture unit 601. As described in the first embodiment, it is also possible that the first image is divided into regions and the exempla are increased to expand the exemplum map to the dimensions of the region of the object. Thereby, even if the dimensions of the exemplum map is smaller than the dimensions of an output image or the dimensions of the object, the mesostructure can be reconstructed over the entire image.

Figure 8:
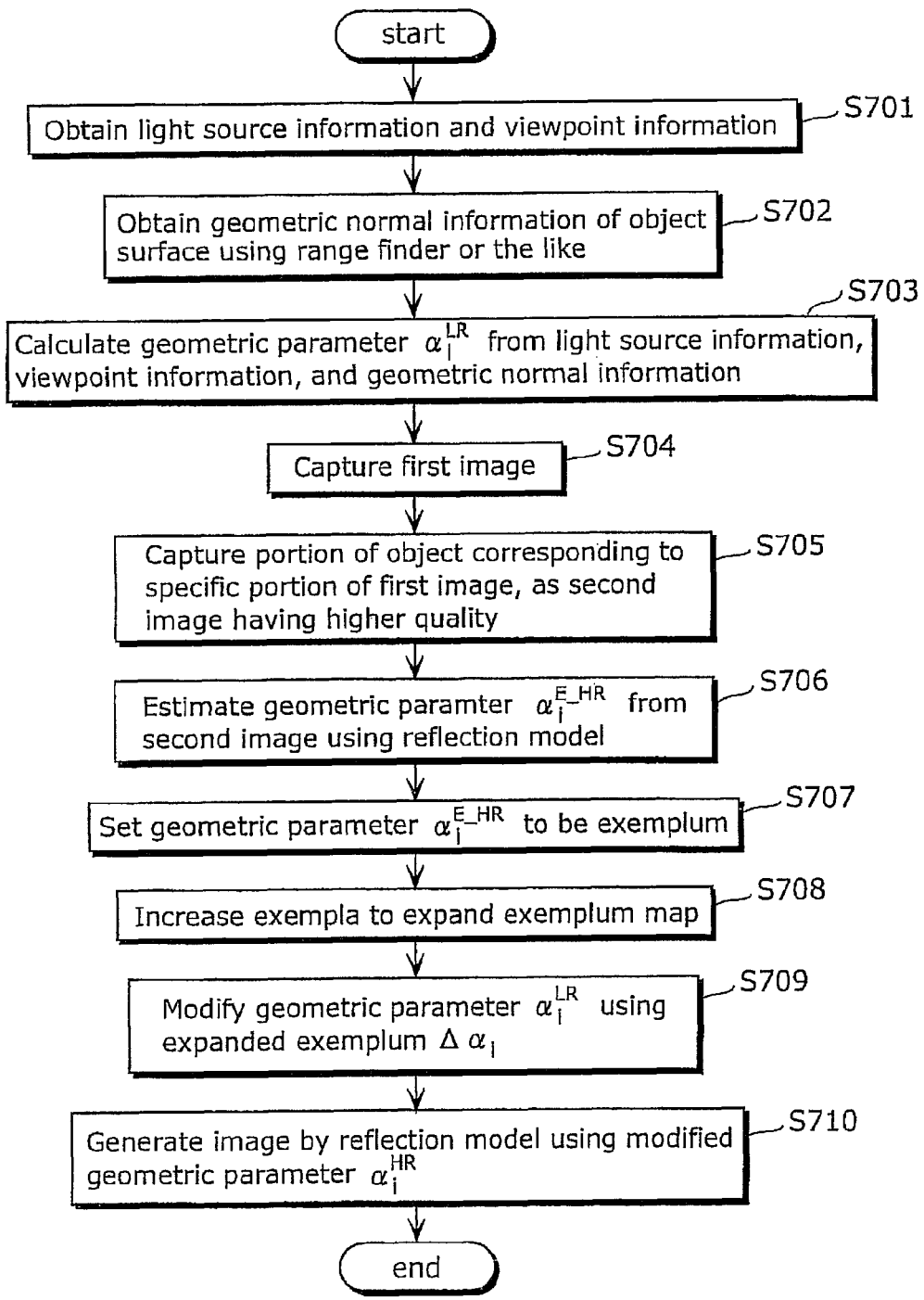
FIG. 8 is a flowchart showing basic processing performed by the image generation device according to the second embodiment of the present invention.
Figure 9:
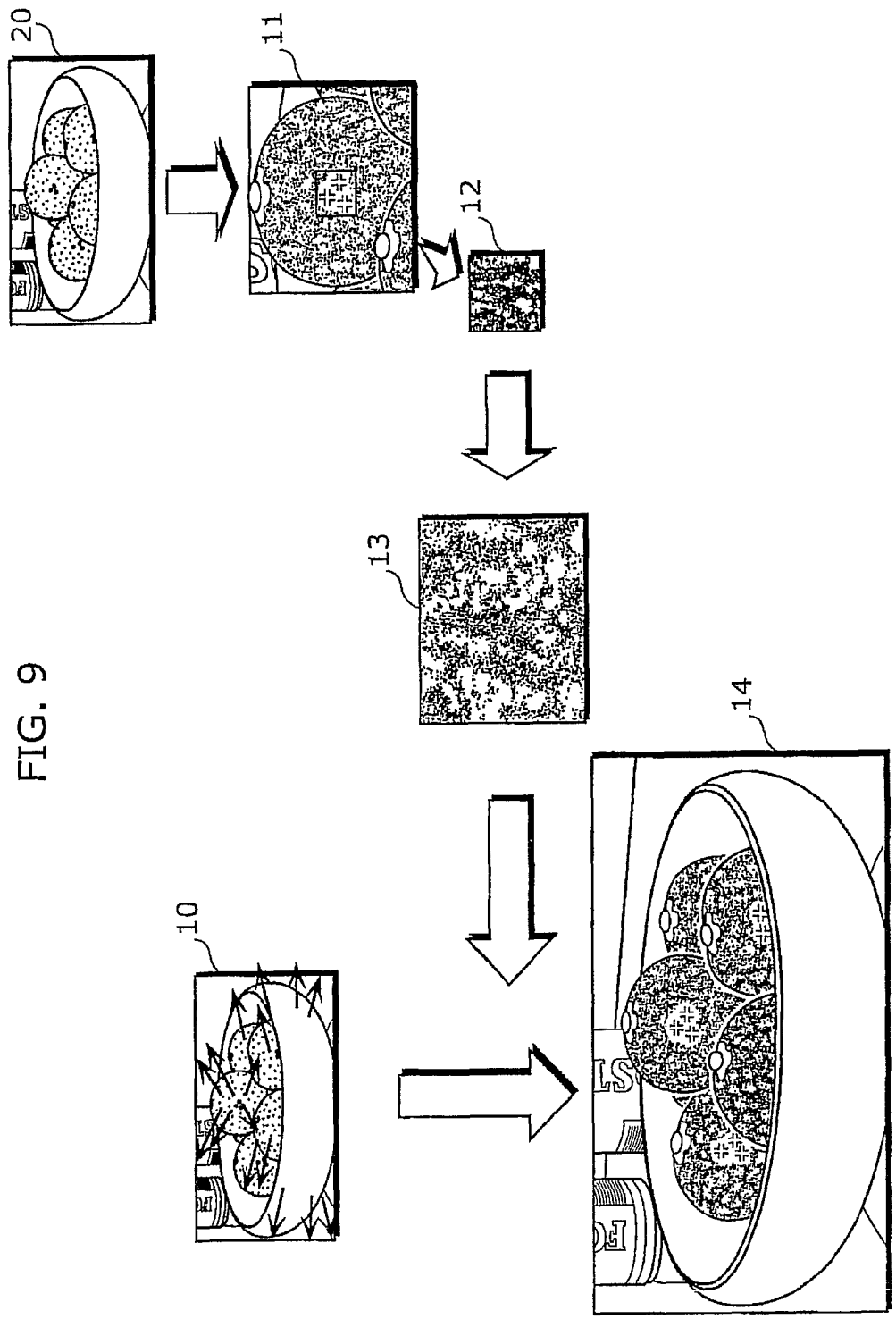
FIG. 9 is a schematic diagram showing information and an image generated by the image generation device according to the second embodiment of the present invention.

The following describes processing performed by the image generation device having the above structure according to the second embodiment of the present invention (namely, an image generation method according to the present invention), with reference to a flowchart of FIG. 8 and schematic diagrams of information and images of FIG. 9. In the image generation method according to the second embodiment, a high-quality image of an object more clearly showing a surface structure such as bumps on a surface of the object is generated from a high-quality image of a portion of a low-quality image of the object.

Here, the Steps S201 to S203 of FIG. 2 according to the first embodiment are identical to Steps S701 to 703 of FIG. 8 according to the second embodiment, respectively, so that the identical steps are not explained again below.

At Step S704, the first image capture unit 601 generates a first image (refer to the first image 20 of FIG. 9) of the object by capturing an image of the object using a digital camera or the like.

Figure 10:
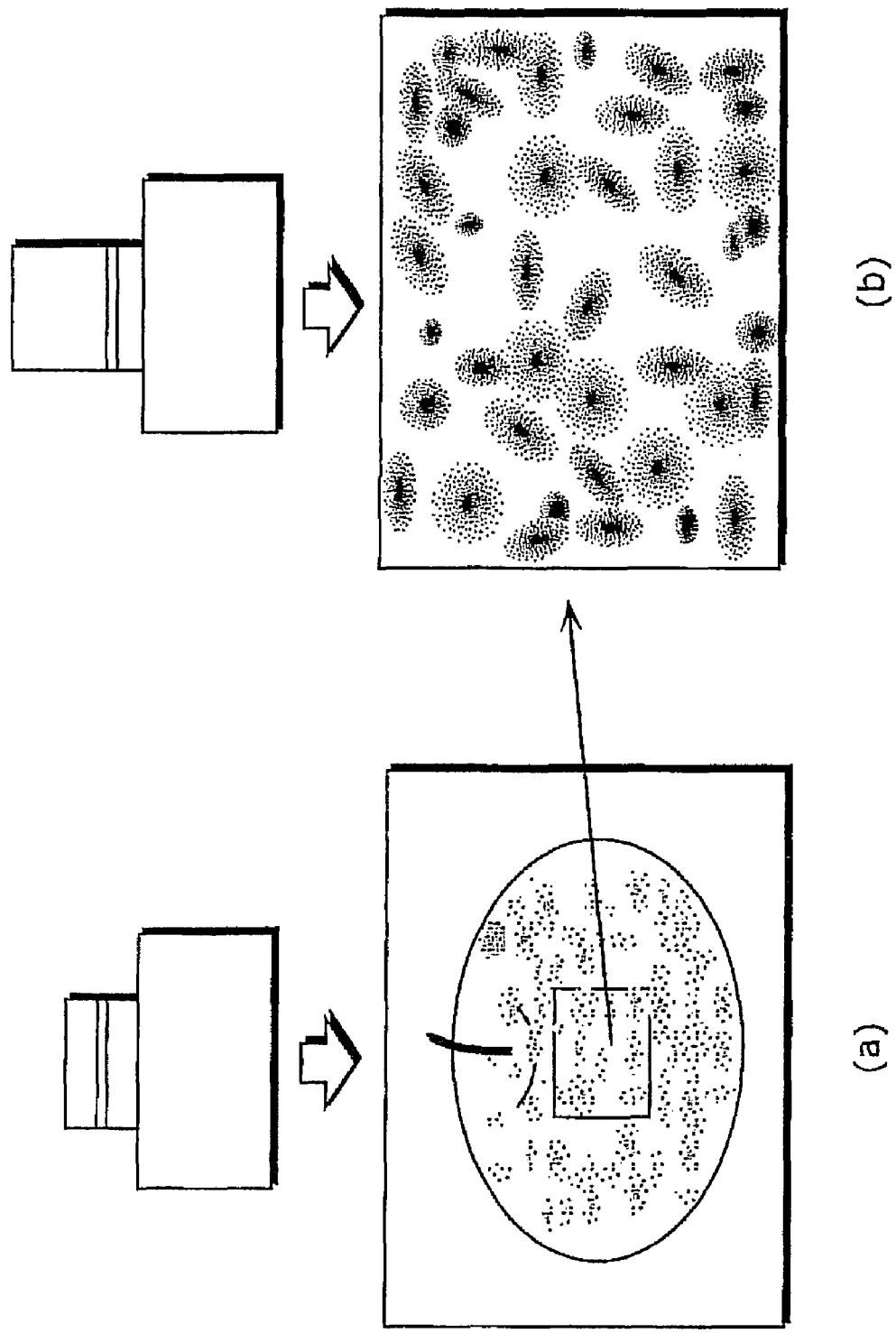
FIGS. 10 (*a*) and (*b*) show examples of a first captured image and a second captured image, respectively, according to the second embodiment of the present invention.

Next, at Step S705, the second image capture unit 602 generates a second image (refer to the second 11 of FIG. 9) having quality higher than the first image, by capturing an image of a portion of the object corresponding to a highlight region of the first image. The image-capturing of the portion corresponding to the highlight region of the first image enables the reflection model to be applicable. It should be note that the second image may be generated by using the same camera having a zooming function as the camera used for the first image, or may be by using a camera different from the camera used for the first image. It should also be noted that the highlight region of the first image captured by the first image capture unit 601 may be a region having a center with the highest brightness value in the first image. It is also possible that the highlight region of the first image is decided by segmenting the first image into blocks each having certain dimensions, then calculating an average brightness value for each block, and selecting a region having the highest average brightness value as the highlight region. Furthermore, the highlight region of the first image may be a region with a peak of the distribution of brightness values in the block. More specifically, an image of a portion of the object corresponding to a region of the first image captured by the first image capture unit 601 as shown in (a) of FIG. 10 is captured with high quality by the second image capture unit 602 to generate the second image as shown in (b) of FIG. 10. The sparse dots in (a) of FIG. 10 show that an image of mesostructure is not captured appropriately due to an insufficient resolution. However, high-quality image-capturing of the portion enables an image of the mesostructure to be captured appropriately as shown in (b) of FIG. 10.

Then, at Step S706, from the second image generated at Step S705, the second geometric parameter estimation unit 603 estimates, as an exemplum, a geometric parameter $\alpha_i^{E\_HR}$ indicating a high-resolution component using a reflection model. The estimation is performed as explained below.

The Equation 8 is rewritten to the following Equation 9.

$$Q_i = -(\alpha_i^{E\_HR^2}/m^2) + C \quad \text{(Equation 9)}$$

where C is a constant number. In the same manner as described in the first embodiment, a value of m corresponding to the object may be previously held, or the image generation may be performed setting m to a certain value such as 0.1. Furthermore, m may be estimated from the image.

However, the following Equation 10 is given.

$$Q_i = \log I_i \quad \text{(Equation 10)}$$

Here, C is determined by the following Equation 11.

$$C = \max(Q_i) \quad \text{(Equation 11)}$$

where max means a maximum value. Here, it is assumed that a brightness value becomes maximum when the geometric parameter $\alpha_i^{E\_HR}$ is 0.

Next, the geometric parameter $\alpha_i^{E\_HR}$ indicating a high-resolution component of mesostructure is determined by the following Equation 12 using the above Equations 9 and 11.

$$\alpha_i^{E\_HR} = m\sqrt{\max(Q_i) - Q_i} \quad \text{(Equation 12)}$$

Then, at S707, the exemplum generation unit 604 generates each exemplum in an exemplum map (refer to the exemplum map 12 of FIG. 9), and stores the generated exemplum into the high-resolution database unit 103.

$$\Delta\alpha_i = \alpha_i^{E\_HR} \quad \text{(Equation 13)}$$

This means that the geometric parameter $\alpha_i^{E\_HR}$ is simply set to be the exemplum $\Delta\alpha_i$. Here, as explained in the first embodiment, the exemplum map indicated by the exempla has dimensions of N×M as shown in FIG. 5A, and each of exempla does not indicate pixel brightness but a geometric parameter $\Delta\alpha_i$ of a high-resolution component of mesostructure. Of course, the exemplum map indicated by the exempla is not limited to a square or a rectangular. In addition, the dimensions of the exemplum map may be smaller than the dimensions of the input image. In FIG. 5A, a darker portion shows a greater value of the geometric parameter $\Delta\alpha_i$. In the technique disclosed in Patent Reference 2, the information regarding the mesostructure is indicated by distribution of points using Gaussian model. Therefore, as shown in FIG. 5B, the technique disclosed in Patent Reference 2 fails to indicate spatial consecution that is seen in the mesostructure. However, the second embodiment of the present invention can solve the above problem of the conventional technology, indicating the mesostructure by the exemplum map in a two-dimensional map having dimensions of N×M.

Next, at Step S708, the exemplum expansion unit 104 increases the exempla which are generated at Step S707 and stored in the high-resolution database unit 103, in order to spatially expand the exemplum map indicated by the exempla, in the same manner as described for Step S204 of FIG. 2 (refer to an expanded exemplum map 13 in FIG. 9).

Steps S709 and S710 are identical to the Steps S205 and S206 of FIG. 2 in the first embodiment, respectively. That is, the same processing is performed to generate the output image (refer to an output image 14 in FIG. 9). Therefore, the identical steps are not explained again below.

As described above, by the image generation device and the image generation method according to the second embodiment, an image of a portion of the object corresponding to the highlight region of the first image is captured to have high quality, then from the resulting high-quality image, geometric parameters regarding high-resolution components capable of indicating the mesostructure are estimated, and an output image is generated by a reflection model using the high-resolution components. Thereby, the image generation device and the image generation method according to the second embodiment can generate a high-quality image of an object more clearly showing a surface structure such as bumps on a surface of the object, based on information regarding the surface structure which is generated from a low-quality image or the like of the object. In addition, the information regarding the surface structure reflects a position of a light source, and such information is applied to the reflection model to generate the output image. This means that the image generation device and the image generation method according to the second embodiment can set a light source at any desired position, which makes it possible to generate an image of the object under a pseudo light source emitting light from any desired position.

Third Embodiment

Figure 11:
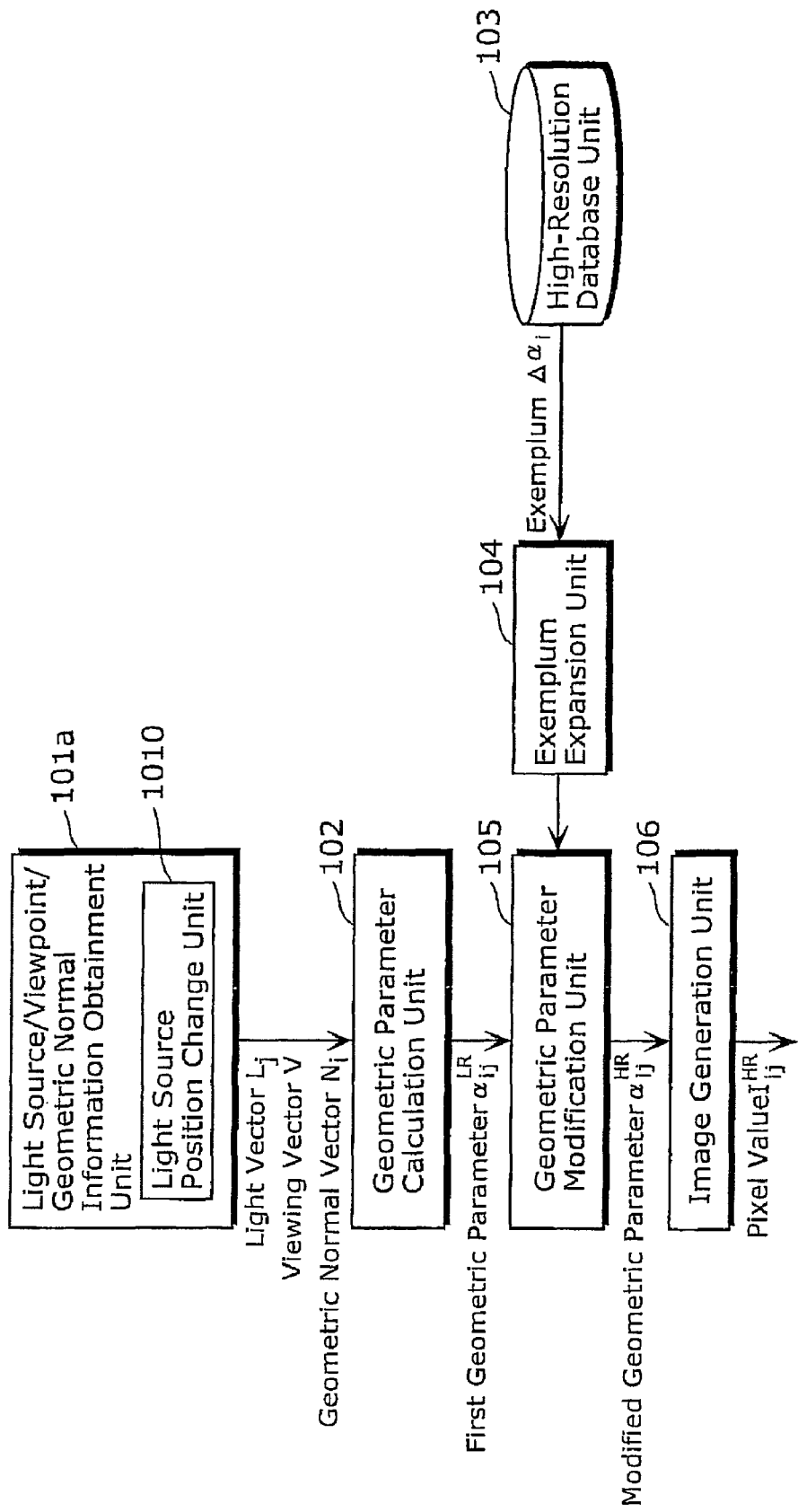
FIG. 11 is a diagram showing a basic structure of an image generation device according to a modification of the first embodiment of the present invention.
Figure 12:
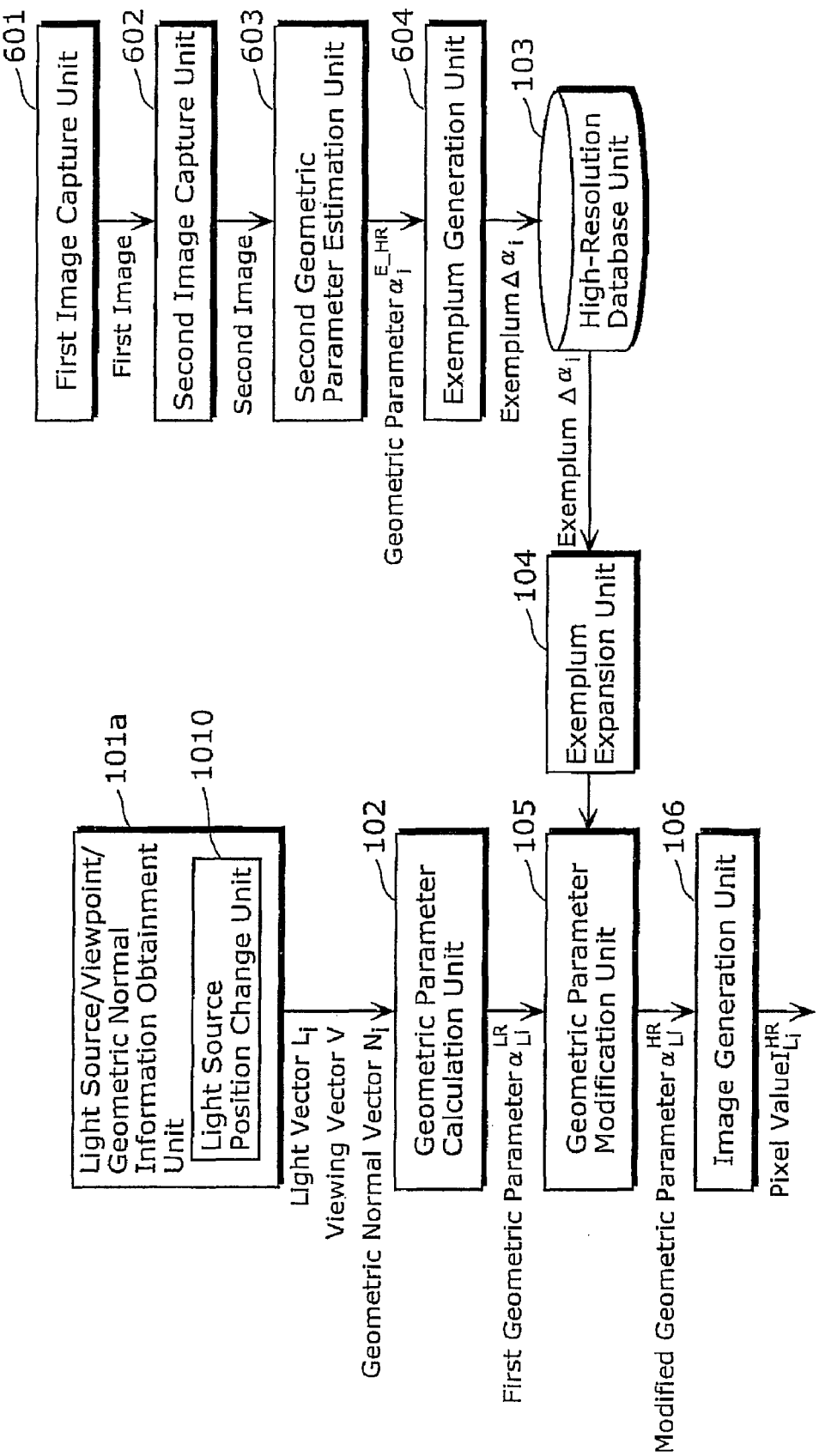
FIG. 12 is a diagram showing a basic structure of an image generation device according to a modification of the second embodiment of the present invention.

The following describes an image generation device and an image generation method according to the third embodiment with reference to the drawings. The image generation device and the image generation method according to the third embodiment can achieve image generation under a pseudo light source emitting light from any desired position, in addition to the image generation with high quality showing the mesostructure as described in the first and second embodiment. As shown in FIGS. 11 and 12, a structure of the image generation device according to the third embodiment differs from each structure of the image generation devices according to the first to second embodiments in that the light source/viewpoint/geometric normal information obtainment unit 101 is replaced by a light source/viewpoint/geometric normal information obtainment unit 101a that obtains pseudo position information of a light source. In other words, a plurality of desired positions of the light source are used as the position information of the light source in the third embodiment. Therefore, the below description is given mainly for the light source/viewpoint/geometric normal information obtainment unit 101a that is a great difference from the first and second embodiments. The image generation method of the third embodiment differs from the image generation methods of the first and second embodiments in changing the light vector L to change the corresponding geometric parameter $\alpha_i^{HR}$ indicating the mesostructure, as described below in more detail.

In other words, the image generation device according to the third embodiment can be called a modification (as shown in each of FIG. 11 and FIG. 12) of each of the image generation devices according to the first and second embodiment, by replacing the light source/viewpoint/geometric normal information obtainment unit 101 by the light source/viewpoint/geometric normal information obtainment unit 101a. The light source/viewpoint/geometric normal information obtainment unit 101a further includes a light source position change unit 1010 in addition to the function of the light source/viewpoint/geometric normal information obtainment unit 101. The light source position change unit 1010 generates plural pieces of position information of the light source. In more detail, the light source position change unit 1010 generates plural pieces of position information of the light source, by varying a position of the light source obtained by the light source/viewpoint/geometric normal information obtainment unit 101a along a route designated by a user, or by receiving designation of plural positions of the light source from the user.

Figure 13A:
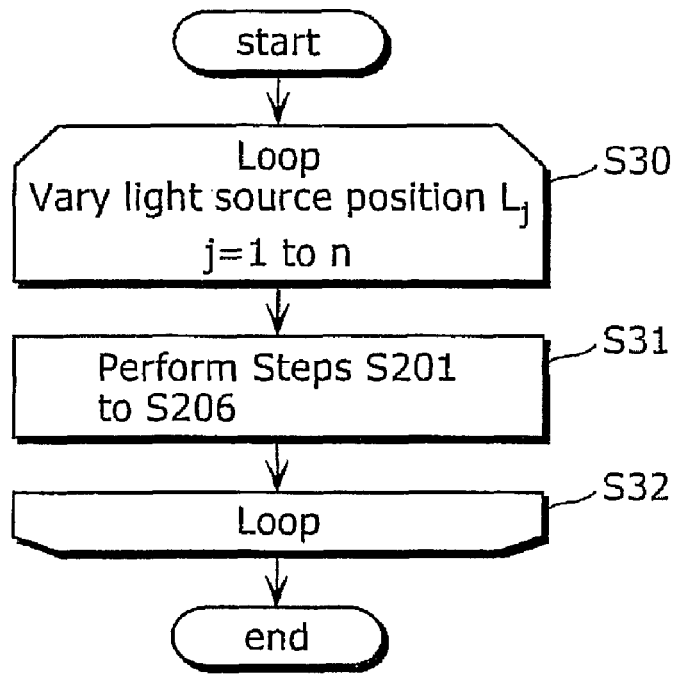
FIG. 13A is a flowchart showing basic processing performed by the image generation device according to the modification of the first embodiment of the present invention.

Next, the processing performed by the image generation device shown in FIG. 11 according to the third embodiment is described with reference to a flowchart of FIG. 13A. This image generation device according to the third embodiment is a modification of the image generation device according to the first embodiment.

Firstly, a light vector L of the light source is virtually varied to generated light vectors $L_j$ by varying a position $L_j$ of the light source (S30). Then, using each light vector $L_j$ as well as the geometric normal vector and the viewing vector V which have been obtained by the light source/viewpoint/geometric normal information obtainment unit 101a, the geometric parameter calculation unit 102 calculates a geometric parameter $\alpha_{ij}^{LR}$ for each of the varied position of the light source, by the following Equation 14 (Steps S201 to S203 in S31).

$$\alpha_{ij}^{LR} = \arccos(N_i \cdot H_j) \quad \text{(Equation 14)}$$

Here, $H_j$ is determined by the following Equation 15. The viewing vector V does not depend on the change j of the position of the light source and a point i on the object.

[Equation 15]

$$H_j = \frac{0.5(L_j + V)}{\|0.5(L_j + V)\|} \quad \text{(Equation 15)}$$

Figure 14:
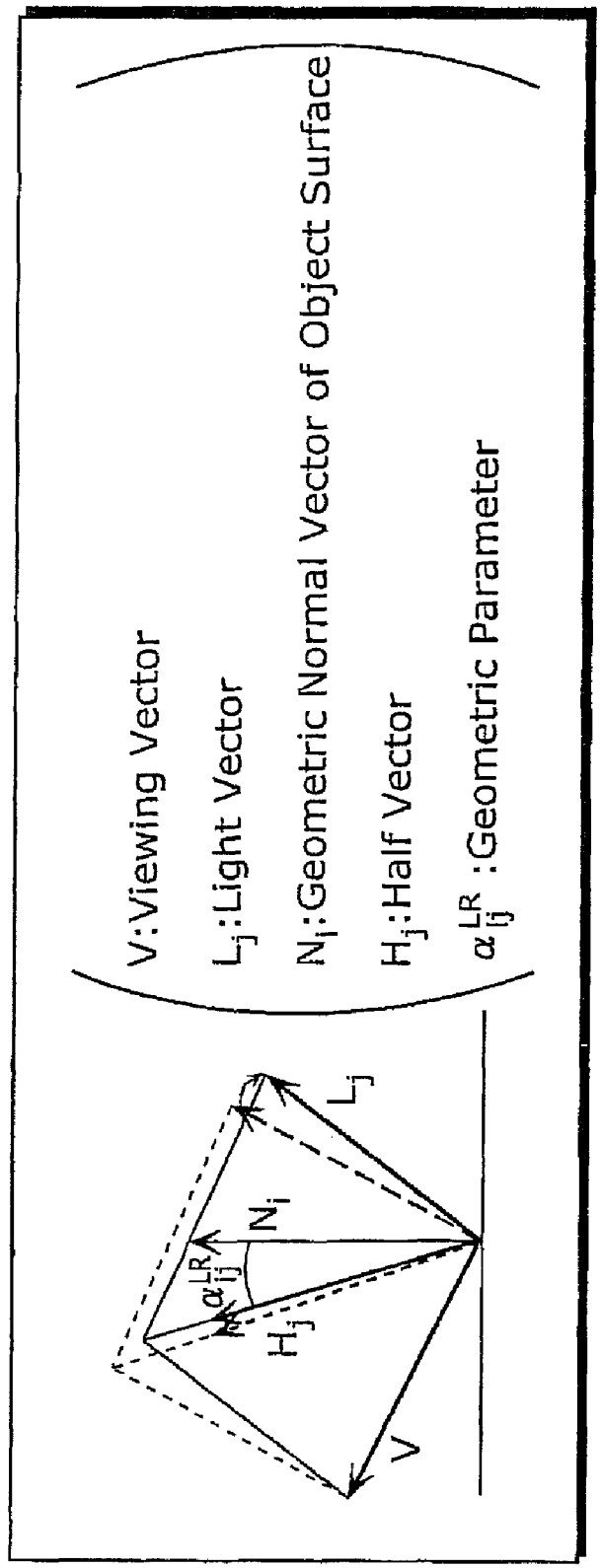
FIG. 14 is graph showing one example of a geometric parameter used for image generation under a pseudo light source according to the third embodiment of the present invention.

FIG. 14 shows how the geometric parameter $\alpha_i^{LR}$ is changed to a geometric parameter $\alpha_{ij}^{LR}$ or when when the light vector L is changed to the light vector $L_j$. When the light vector L is changed from a dashed line to a solid line to be the light vector $L_j$, the half vector H is also changed from a dashed line to a solid line to be a half vector $H_j$, as shown in the Equation 15. With the changes, the geometric parameter $\alpha_i^{LR}$ is changed to the geometric parameter $\alpha_{ij}^{LR}$ as seen in the Equation 14. Thereby, the geometric parameter $\alpha_{ij}^{LR}$ corresponding to each of the varied position of the light source is generated.

Referring back to FIG. 13A, in the similar manner as described at Step 205 in the first embodiment, the geometric parameter $\alpha_{ij}^{LR}$ corresponding to each of varied position of the light source is added with the geometric parameter $\Delta\alpha_i$ obtained at Step S204 which includes a mesostructure component and is spatially expanded, thereby modifying the geometric parameter $\alpha_{ij}^{LR}$ using the following Equation 16 (Steps S204 and S205 in S31).

$$\alpha_{ij}^{HR} = \alpha_{ij}^{LR} + \Delta\alpha_i \quad \text{(Equation 16)}$$

Thereby, a modified geometric parameter $\alpha_{ij}^{HR}$ that corresponds the each change j of the position of the light source and is used to generate an image under a pseudo light source can be generated. Using the modified geometric parameter $\alpha_{ij}^{HR}$ instead of the geometric parameter $\alpha_i^{HR}$, an output image under the pseudo light source is generated in the same manner as described at Step S206 in the first embodiment (Step S206 in S31, and then S32).

Figure 15:
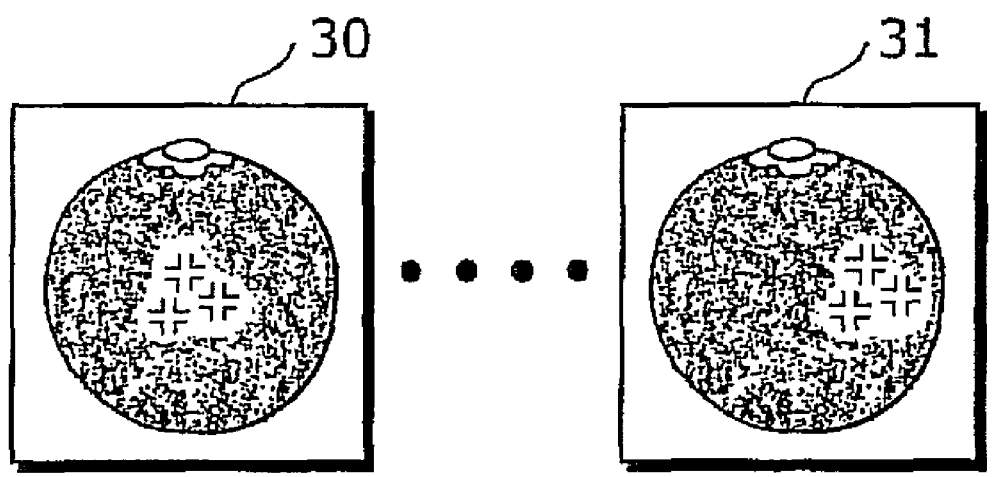
FIG. 15 is a diagram showing one example of generated images (video) under pseudo light sources according to the third embodiment of the present invention.

It should be noted that it is also possible to generate plural images under pseudo light sources corresponding to each of varied light vectors $L_j$, respectively, by slightly and consecutively varying the light vector $L_j$ (S30 to S32), and arrange the generated images as a video including images 30 to 31 as shown in FIG. 15.

Figure 13B:
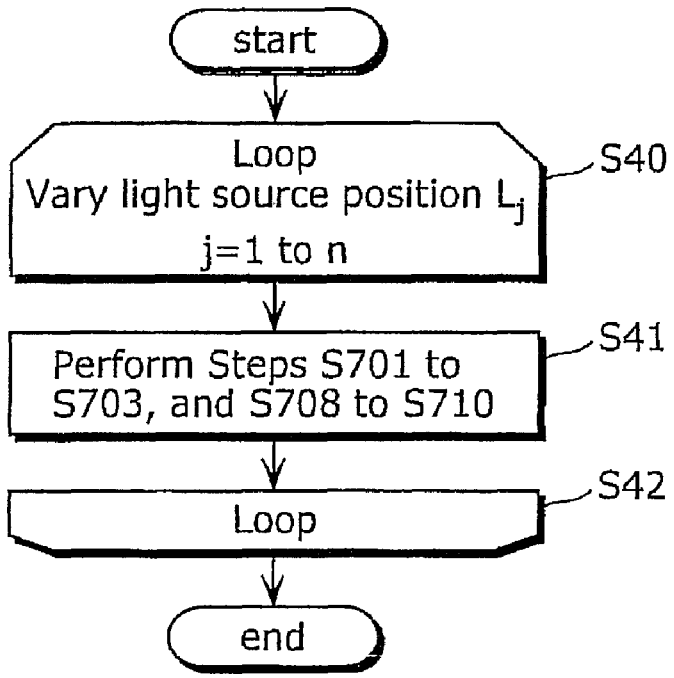
FIG. 13B is a flowchart showing basic processing performed by the image generation device according to the modification of the second embodiment of the present invention.

The same goes for an image generation method performed by another image generation device shown in FIG. 12 according to the third embodiment with reference to a flowchart of FIG. 13B. This image generation device is a modification of the second embodiment. That is, the position $L_i$ of the light source is varied (S40 to S42), and the image generation method of the second embodiment is performed for each of the positions of the light source (S41), thereby generating consecutive images corresponding to the respective positions of the light source.

As described above, the image generation image and the image generation method according to the third embodiment uses a geometric parameter under a pseudo light source which is calculated under the control of the light source position change unit 1010 that has a function of generating plural pieces of position information as the position information of the light source in addition to the function as described in the first and second embodiment. Thereby, the image generation image and the image generation method according to the third embodiment can generate an image of the object under a pseudo light source emitting light from any desired position, while using the mesostructure of the surface structure of the object.

Modifications of First to Third Embodiments

Figure 16:
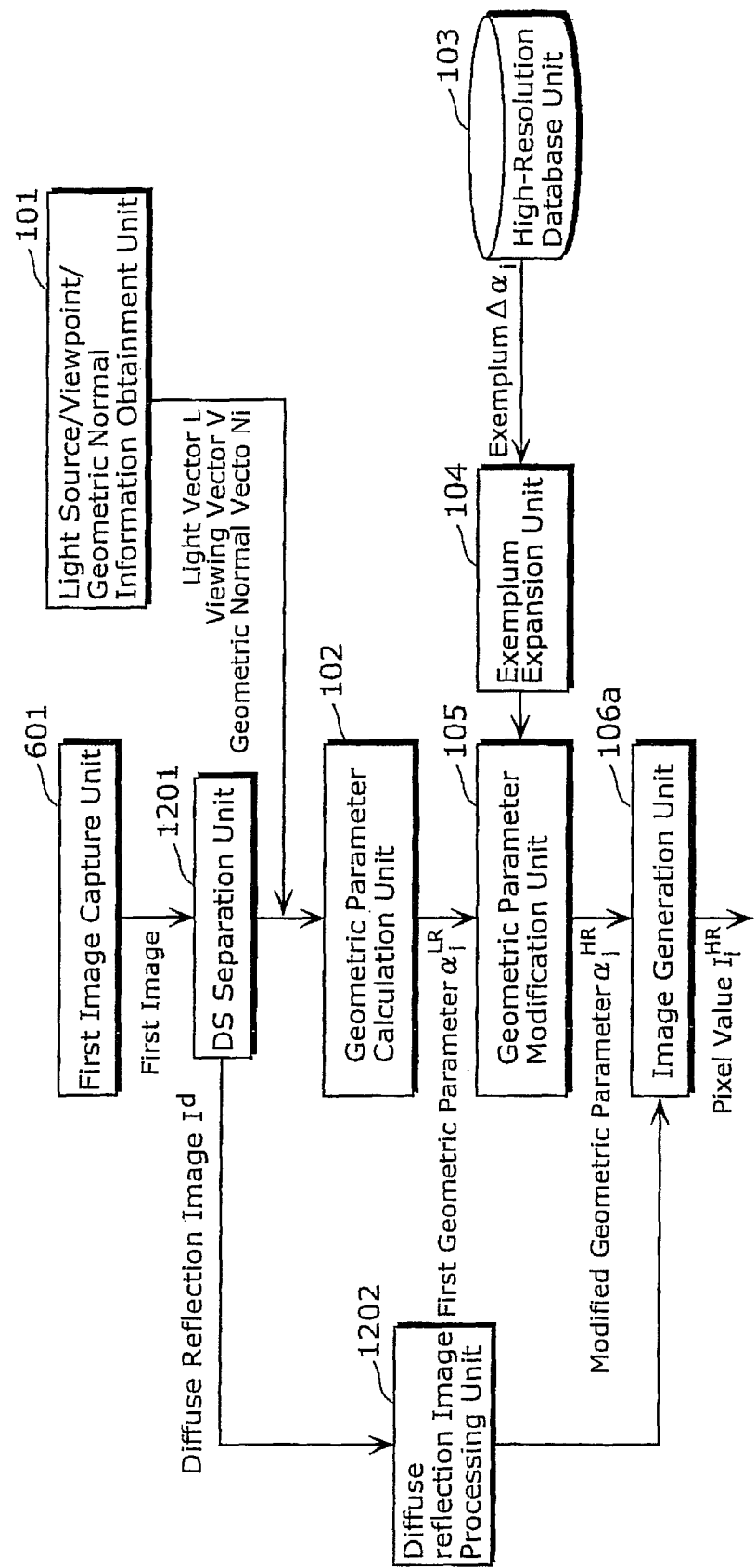
FIG. 16 is a diagram showing a basic structure of an image generation device according to a modification of any of the first to third embodiments of the present invention.

The following describes an image generation device and an image generation method which achieve higher fineness in the image generation methods according to the first to third embodiments. The image generation device and the image generation method are described as a modification of the first embodiment, but can be applied to the second and third embodiments. FIG. 16 is a diagram showing a structure of the image generation device according to the modification of the first embodiment. The image generation device of FIG. 16 according to the modification of the first embodiment generates a high-quality image of an object more clearly showing a surface structure such as bumps on a surface of the object, based on information regarding the surface structure which is generated from a low-quality image of the object. In order to achieve the above generation of the high-quality image, the image generation device of FIG. 16 separates an input image into a diffuse reflection image and a specular reflection image, and applies a reflection model to the separated specular reflection image, thereby estimating geometric parameters which can indicate the mesostructure with higher fineness. The image generation device of FIG. 16 includes the light source/viewpoint/geometric normal information obtainment unit 101, the geometric parameter calculation unit 102, the high-resolution database unit 103, the exemplum expansion unit 104, the geometric parameter modification unit 105, an image generation unit 106a, the first image capture unit 601, a DS separation unit 1201, and a diffuse reflection image processing unit 1202. The structure of the image generation device of FIG. 16 according to the modification differs from the structure of the image generation device of FIG. 1 according to the first embodiment in further including the first image capture unit 601, the DS separation unit 1201, and the diffuse reflection image processing unit 1202, as well as the image generation unit 106a which is modified from the image generation unit 106.

The first image capture unit 601 is identical to the first image capture unit 601 in FIG. 12 according to the second embodiment, so that the description for the first image capture unit 601 is not given again below. Here, the first image capture unit 601 is assumed to generate a color image as the first image.

The DS separation unit 1201 separates the first image captured by the first image capture unit 601 into diffuse reflection components and specular reflection components. Hereinafter, the separated images are referred to as a diffuse reflection image and a specular reflection image, respectively.

This image generation device according to the modification differs from the image generation device according to the first embodiment in that the geometric parameter calculation unit 102 and the geometric parameter modification unit 105 perform their processing only on the specular reflection image separated by the DS separation unit 1201.

The diffuse reflection image processing unit 1202 performs image processing on the diffuse reflection image separated from the input image by the DS separation unit 1201. Here, the diffuse reflection image processing unit 1202 may perform the processing to increase a resolution of the diffuse reflection image, or may perform nothing on the diffuse reflection image itself.

The image generation unit 106a generates a high-quality specular reflection image including mesostructure components, using the modified geometric parameters for the reflection model. Then, the high-quality specular reflection image is synthesized with the diffuse reflection image separated by the DS separation unit 1201 or the diffuse reflection image processed by the diffuse reflection image processing unit 1202, thereby generating an output image.

Figure 17:
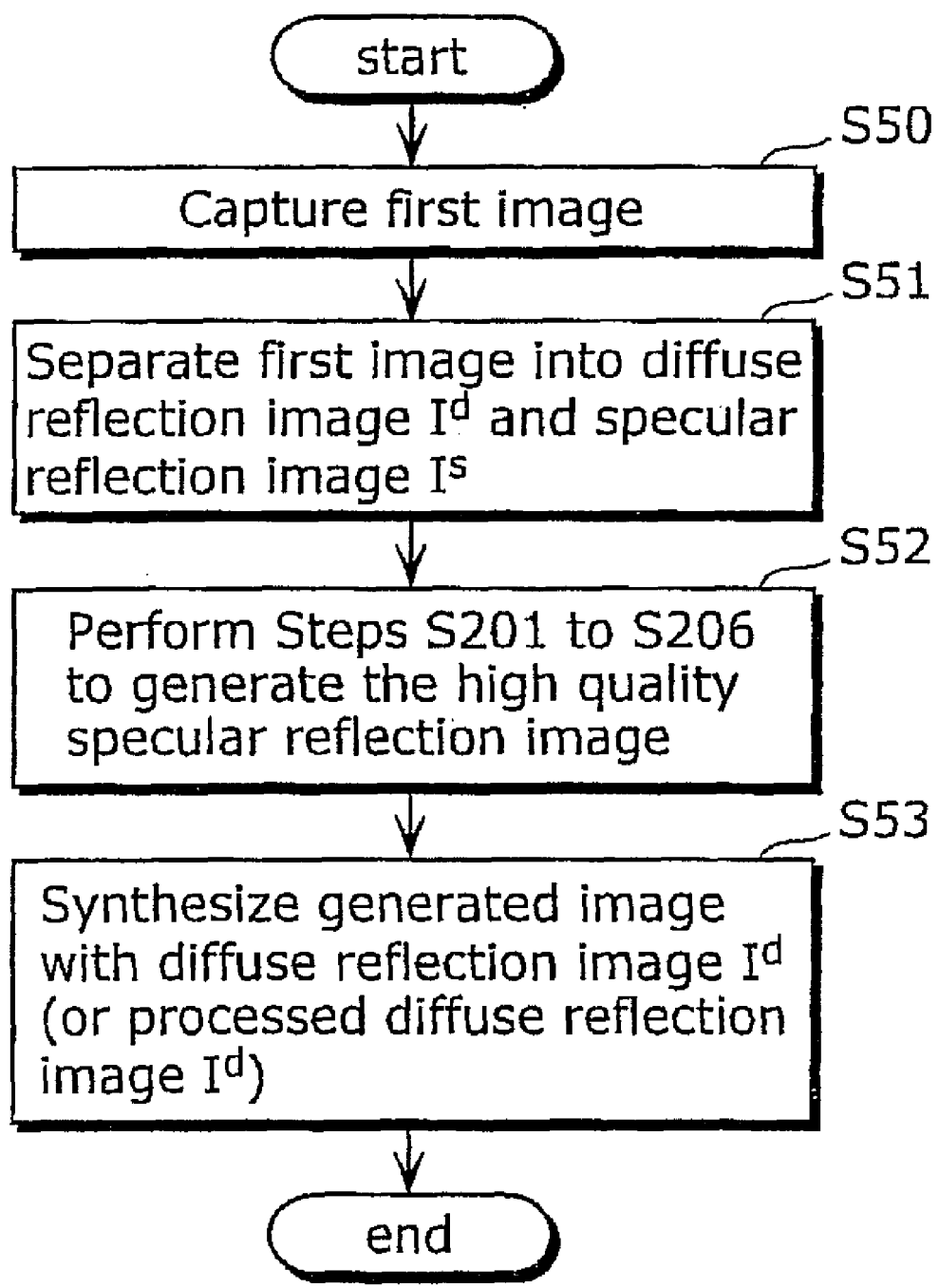
FIG. 17 is a flowchart of processing performed by the image generation device according to the modification of any of the first to third embodiments of the present invention.

The following describes the processing performed by the DS separation unit 1201, the diffuse reflection image processing unit 1202, and the image generation unit 106a in more detail with reference to a flowchart of FIG. 17.

Firstly, the first image capture unit 601 generates an input image I as the first image (S50). Then, the DS separation unit 1201 separates the input image I into a diffuse reflection image $I^d$ and a specular reflection image $I^s$ as indicated by the following Equation 17 (S51).

$$I = I^s + I^d \qquad \text{(Equation 17)}$$

The method of separating a color input image into a diffuse reflection image $I^d$ and a specular reflection image V is disclosed in Non Patent Reference 7.

[Non Patent Reference 7] "Separation of Reflection Components Using Color and Polarization", Shree K. Nayer, Xi-Sheng Wang, and Terrance Boult, International Journal of Computer Vision, No. 21, Vol. 3, pp. 163-186, 1997

Next, the geometric parameter calculation unit 102, the exemplum expansion unit 104, and the geometric parameter modification unit 105 perform the same processing as described in the first embodiment, to generate a high-quality specular reflection image and replace the specular reflection image separated by the DS separation unit 1201 by the generated high-quality specular reflection image (S52). It is desirable that prior to creating a database the specular reflection components are extracted from the input image using the above technique, and then the high-resolution database unit 103 holds geometric parameters including mesostructure components which are obtained from the extracted specular reflection components. More specifically, in order to perform the processing described using the Equations 8 to 12, the Equation 10 in the second embodiment is rewritten to the following Equation 18. Of course, it is desirable that the second geometric parameter estimation unit 603 that is identical to the second geometric parameter estimation unit 603 of the second embodiment performs its processing on the specular reflection components.

$$Q_i = \log I_i^s \quad \text{(Equation 18)}$$

By the processing described using the Equations 5 to 8 of the first embodiment, the image generation unit 106a generates a high-resolution specular reflection image $I_i^{S\_HR}$ including mesostructure components. Then, the image generation unit 106a synthesizes the high-resolution specular reflection image with the diffuse reflection image as indicated in the following Equation 19, thereby generating a high-quality image $I^{HR}$ of the object more clearly showing the surface structure such as bumps, from the low-quality image of the object (S53).

$$I_i^{HR} = I_i^{S\_HR} + I_i^d \quad \text{(Equation 19)}$$

Moreover, when an output image is to be generated under a pseudo light source while showing the mesostructure as described in the third embodiment, a geometric parameter $\alpha_{Li}^{HR}$ for generating an image under a pseudo light source is calculated by the processing described using the Equations 14 to 16, and then using the geometric parameter $\alpha_{Li}^{HR}$, a high-quality specular reflection image $I_{Li}^{S\_HR}$ including mesostructure components under the pseudo light source is generated by the processing described using the Equations 5 to 8 in the first embodiment. Then, the high-quality specular reflection image $I_{Li}^{S\_HR}$ is synthesized with the diffuse reflection image as indicated by the following. Equation 20 to generate an output image. Thereby, by using a geometric parameter under a pseudo light source in the image generation unit, it is possible to generate a high-quality image of the object under the pseudo light source while reflecting the mesostructure of the surface structure of the object.

$$I_i^{HR} = I_{Li}^{S\_HR} + I_i^d \quad \text{(Equation 20)}$$

It should be noted that the diffuse reflection image processing unit 1202 may use the diffuse reflection image itself separated by the DS separation unit 1201, or may generate albedo that is not influenced by a position of the light source by a method described in Patent Reference 3. If albedo is generated, a diffuse reflection image under a pseudo light source is generated from the albedo, and the generated diffuse reflection image is synthesized with the high-quality specular reflection image $I_{Li}^{S\_HR}$ including mesostructure components, thereby generating an output image with higher quality. It is also possible that a resolution of a diffuse reflection image is increased using albedo by the technique of the Patent Reference 3, and the generated high-resolution diffuse reflection image is synthesized with the high-quality specular reflection image.

[Patent Reference 3] Japanese Patent No. 4082714

As described above, the image generation device and the image generation method according to the modification separate an input image into diffuse reflection components and specular reflection components, and applies a reflection model only to the specular reflection components to increase quality. This means that the reflection model is applied only to image components for which the reflection model is originally to be applied (namely, specular reflection components). Thereby, the image generation device and the image generation method according to the modification can generate a high-quality image of the object more correctly and clearly showing a surface structure such as bumps on a surface of the object by using the mesostructure. In addition, while clearly showing the surface structure such as bumps by using the mesostructure, the image generation device and the image generation method according to the modification can generate an image of the object under a pseudo light source emitting light from any desired position.

Although only some exemplary embodiments and an modification of the image generation device and the image generation method according to the present invention have been described in detail above, those skilled in the art will be readily appreciate that many modifications are possible in the exemplary embodiments without materially departing from the novel teachings and advantages of the present invention. Accordingly, all such modifications are intended to be included within the scope of this invention.

Furthermore, those skilled in the art will be readily combine the elements in the embodiments and modifications without materially departing from the novel teachings and advantages of the present invention.

INDUSTRIAL APPLICABILITY

The present invention is a device that (i) generates, based on information regarding a surface structure such as bumps of a surface of an object which is generated from a low-quality image of the object, a high-quality image of the object more clearly showing the surface structure by using a mesostructure of the surface structure, and also (ii) generates the image under a pseudo light source emitting light from any desired position while showing the surface structure such as bumps. The present invention can be used as an image generation device or the like which is embedded in an image display apparatus such as a digital camera or a security camera.

The invention claimed is:

1. An image generation device that generates, based on information obtained from a first image of an object regarding a surface structure of a surface of the object, a second image of the object which shows the surface structure in greater detail than the first image, the object of the second image being illuminated by a light source and viewed from a viewpoint, said image generation device comprising:
    an information obtainment unit configured to obtain position information of the light source, position information of the viewpoint, and geometric normal information regarding the surface structure in the first image;
    a geometric parameter calculation unit configured to calculate a first geometric parameter corresponding to an angle between a half vector and a geometric normal vector, for each point of the surface corresponding to a pixel in the second image, the half vector being generated by adding a unit vector indicating a direction of the light source with a unit vector indicating a direction of the viewpoint;
    a high-resolution database unit in which a plurality of second geometric parameters are stored, each of the second geometric parameters indicating a mesostructure of a portion of the surface and having a spatial resolution higher than a spatial resolution of the geometric normal information;
    an exemplum expansion unit configured to read out the second geometric parameters from said high-resolution database unit, and spatially increase the readout second geometric parameters so that a spatial region indicated by the spatially increased second geometric parameters covers the surface of the object in the second image;

a geometric parameter modification unit configured to calculate modified geometric parameters by modifying the first geometric parameters using the spatially increased second geometric parameters; and an image generation unit configured to (i) apply, to a reflection model, the modified geometric parameters, the position information of the light source, the position information of the viewpoint, and the geometric normal information regarding the surface structure, (ii) calculate a pixel value of each point, and (iii) generate the second image showing the mesostructure using the geometric normal information.

2. The image generation device according to claim 1, wherein said information obtainment unit is configured to obtain the geometric normal information, by calculating the geometric normal information from information which is generated by one of a stereo camera, a range finder, and another shape detection device which capture an image of the object.

3. The image generation device according to claim 1, wherein the reflection model is a mathematical expression for calculating a pixel value of a point in the second image using the geometric normal information, the position information of the viewpoint, and a geometric parameter which are regarding the point, and said image generation unit is configured to calculate the pixel value of the each point, by applying, to the reflection model, the geometric normal information and the position information of the viewpoint which are obtained by said information obtainment unit in addition to the modified geometric parameter.

4. The image generation device according to claim 1, further comprising:

a first image capture unit configured to generate the first image, by capturing an image of the object;

a second image capture unit configured to generate the second image, by capturing an image of a portion of the object with a resolution higher than a resolution of the first image, the portion corresponding to a highlight region of the first image to have higher quality in the second image;

a geometric parameter estimation unit configured to estimate the second geometric parameters using as an objective function a pixel value of the second image generated by said second image capture unit; and an exemplum generation unit configured to store the second geometric parameters into said high-resolution database unit.

5. The image generation device according to claim 4, wherein said second image capture unit is configured to generate the second image, by capturing an image of the portion to be zoomed more than the capturing of the first image.

6. The image generation device according to claim 1, wherein said information obtainment unit is configured to obtain plural pieces of the position information of the light source, said geometric parameter calculation unit is configured to calculate the geometric parameter for each of the plural pieces of the position information of the light source obtained by said information obtainment unit;

said geometric parameter modification unit is configured to calculate the modified geometric parameter for each of the plural pieces of the position information of the light source obtained by said information obtainment unit; and said image generation unit is configured to generate the second image for the plural pieces of the position information of the light source obtained by said information obtainment unit.

7. The image generation device according to claim 1, further comprising:

a first image capture unit configured to generate the first image, by capturing an image of the object; and a separation unit configured to separate the first image generated by said first image capture unit into first specular reflection components and diffuse reflection components, wherein said geometric parameter calculation unit, said exemplum expansion unit, said geometric parameter modification unit, and said image generation unit perform the calculating of the first geometric parameters, the reading out of the second geometric parameters and the increasing of the readout second geometric parameters, the calculating of the modified geometric parameters, and the calculating of the pixel value and the generating of the second image, respectively, to generate second specular reflection components which are different from the first specular reflection components separated by said separation unit, and said image generation unit is configured to further synthesize (i) an image using the second specular reflection components generated by said image generation unit with (ii) an image using the diffuse reflection components separated by said separation unit.

8. The image generation device according to claim 1, further comprising an exemplum generation unit configured to obtain computer graphics data indicating the surface structure, generate the second geometric parameters from the computer graphics data, and store the second geometric parameters into said high-resolution database unit.

9. An image generation method of generating, based on information obtained from a first image of an object regarding a surface structure of a surface of the object, a second image of the object which shows the surface structure in greater detail than the first image, the object of the second image being illuminated by a light source and viewed from a viewpoint, said image generation method comprising:

obtaining position information of the light source, position information of the viewpoint, and geometric normal information regarding the surface structure in the first image;

calculating, using a geometric parameter calculation unit, a first geometric parameter corresponding to an angle between a half vector and a geometric normal vector, for each point of the surface corresponding to a pixel in the second image, the half vector being generated by adding a unit vector indicating a direction of the light source with a unit vector indicating a direction of the viewpoint;

reading out, from a high-resolution database unit, a plurality of second geometric parameters, each of the second geometric parameters indicating a mesostructure of a portion of the surface and having a spatial resolution higher than a spatial resolution of the geometric normal information, and spatially increasing the readout second geometric parameters so that a spatial region indicated by the spatially increased second geometric parameters covers the surface of the object in the second image;

calculating modified geometric parameters by modifying the first geometric parameters using the spatially increased second geometric parameters; and (i) applying, to a reflection model, the modified geometric parameters, the position information of the light source, the position information of the viewpoint, and the geometric normal information regarding the surface structure, (ii) calculating a pixel value of each point, and (iii) generating the second image showing the mesostructure using the geometric normal information.

10. A computer program recorded on a non-transitory computer-readable recording medium,
said computer program for causing a computer to execute the image generation method according to claim 9.

* * * * *